(12) United States Patent
 Shinboku

(10) Patent No.: US 8,327,190 B2
(45) Date of Patent: Dec. 4, 2012

(54) CANDIDATE-PATCH SELECTING APPARATUS, COMPUTER PRODUCT, AND METHOD

(75) Inventor: Tetsuya Shinboku, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/853,686

(22) Filed: Aug. 10, 2010

(65) Prior Publication Data

US 2010/0306600 A1     Dec. 2, 2010

Related U.S. Application Data

(63) Continuation of application No. PCT/JP2008/052995, filed on Feb. 21, 2008.

(51) Int. Cl.
 *G06F 11/00* (2006.01)

(52) U.S. Cl. ........ 714/26; 714/37; 714/38.1; 714/38.11; 714/45; 714/49

(58) Field of Classification Search .................... 714/26, 714/37, 38.1, 38.11, 45, 49
 See application file for complete search history.

(56) References Cited

U.S. PATENT DOCUMENTS

| | | | | |
|---|---|---|---|---|
| 7,293,201 B2* | 11/2007 | Ansari | ........................ | 714/38.14 |
| 7,475,286 B2* | 1/2009 | Altaf et al. | ........................ | 714/27 |
| 2002/0112200 A1* | 8/2002 | Hines | ........................... | 714/38 |
| 2005/0066233 A1* | 3/2005 | Day et al. | ......................... | 714/38 |
| 2007/0050678 A1* | 3/2007 | Estes et al. | ....................... | 714/38 |
| 2008/0313626 A1* | 12/2008 | Kodaka et al. | ................. | 717/168 |
| 2010/0146325 A1* | 6/2010 | John | ................................ | 714/3 |

FOREIGN PATENT DOCUMENTS

| | | |
|---|---|---|
| JP | 59-057349 | 4/1984 |
| JP | 2-39251 | 2/1990 |
| JP | 3-2925 | 1/1991 |
| JP | 2002-197170 | 7/2002 |
| JP | 2003-233512 | 8/2003 |
| JP | 2005-332068 | 12/2005 |

OTHER PUBLICATIONS

English translation of International Preliminary Report on Patentability mailed Nov. 18, 2010, in Int'l. Application No. PCT/JP2008/052995.
International Preliminary Report on Patentability mailed Sep. 2, 2010, in Int'l. Application No. PCT/JP2008/052995.
International Search Report issued on Mar. 25, 2008, in Int'l. Application No. PCT/JP2008/052995.
Japanese Office Action and partial English translation issued in Japanese Application No. 2009-554174 on Aug. 14, 2012.

* cited by examiner

*Primary Examiner* — Charles Ehne
(74) *Attorney, Agent, or Firm* — Greer, Burns & Crain, Ltd.

(57) ABSTRACT

A candidate-patch selecting apparatus includes a detector configured to detect a failure of a computer; an obtaining unit configured to obtain record information for the computer, recorded at the time when the failure detected by the detector occurred; an extractor configured to extract from the record information obtained by the obtaining unit, information identifying the failure; an identifying unit configured to identify, based on a database that stores therein patches and respective selection conditions, a patch for which selection conditions are satisfied by the extracted information identifying the failure; and an output unit configured to output an identification result acquired by the identifying unit.

7 Claims, 22 Drawing Sheets

SYSTEM INFORMATION
· DATE AND TIME OF UPDATE    2006/1/10 8:00:00
· HARDWARE CONFIGURATION    PRESENT
- NAME OF MODEL    xxxxxxx
- CPU    xxxxxxx
- MEMORY    xxxxxxx

- HARD DISK APPARATUS    RAIDA001    PRESENT    FILE SIZE>1 TB

- EXTENDED CARD    SCSIA001    Solaris    V10
                               SCSI DRIVER    V1.0L00

· SOFTWARE CONFIGURATION
- TYPE OF OS, VERSION NUMBER
- NAME OF PROGRAM, VERSION NUMBER (MULTIPLE ITEMS CAN BE DESCRIBED.)

- PATCH NUMBER TO BE APPLIED    20060001 ··· 20060301

FIG.6

```
ANNOUNCED PATCH INFORMATION
· PATCH NUMBER    2007001
· FAILURE NUMBER  N2007-01-0001

· OVERVIEW OF CONTENT OF CORRECTION    SCSI DRIVER IS CORRECTED TO AVOID FAILURES IN WRITING A FILE
                                       OF A CAPACITY EXCEEDING 1 TB, USING A DISK ARRAY APPARATUS:
                                       RAIDA001.

· SUMMARY OF PHENOMENON    IF SCSI DRIVER V1.0 IS USED, WHEN A FILE OF A CAPACITY EXCEEDING 1 TB IS
                           WRITTEN USING A SCSI CARD MANUFACTURED BY COMPANY "A": SCSIA001 AND A
                           DISK ARRAY APPARATUS: RAIDA001, ERR1234 MAY OCCUR AND FILE WRITING MAY
                           FAIL.

· APPLICATION CONDITIONS
- TYPE OF OS, VERSION NUMBER (MULTIPLE ITEMS CAN BE DESCRIBED.)          Solaris        V10
- NAME OF PROGRAM, VERSION NUMBER (MULTIPLE ITEMS CAN BE DESCRIBED.)     SCSI DRIVER    V1.0L00
- RELATED PATCH NUMBER (MULTIPLE ITEMS CAN BE DESCRIBED.)                NONE
- OTHER INCIDENTAL CONDITIONS
  MESSAGE    PRESENT    SCSI driver V1.0L00 |ERR1234:write error DEV-RAIDA001 filesize=1000 GB
  HARDWARE   PRESENT    SCSIA001    RAIDA001
  SOFTWARE   PRESENT    FILE SIZE>1 TB
```

```
ANNOUNCED FAILURE INFORMATION
· TROUBLE MANAGEMENT NUMBER    N2007-01-0001

· SUMMARY OF PHENOMENON        IF SCSI DRIVER V1.0 IS USED, WHEN A FILE OF A CAPACITY EXCEEDING 1 TB IS
                               WRITTEN USING A SCSI CARD MANUFACTURED BY COMPANY "A": SCSIA001 AND A
                               DISK ARRAY APPARATUS: RAIDA001, ERR1234 MAY OCCUR AND FILE WRITING MAY
                               FAIL.

· CONDITIONS OF PHENOMENON
· TYPE OF OS, VERSION NUMBER (MULTIPLE ITEMS CAN BE DESCRIBED.)       Solaris        V10
· NAME OF PROGRAM, VERSION NUMBER (MULTIPLE ITEMS CAN BE DESCRIBED.)  SCSI DRIVER    V1.0L00
· RELATED PATCH NUMBER (MULTIPLE ITEMS CAN BE DESCRIBED.)             NONE
· OTHER INCIDENTAL CONDITIONS
    MESSAGE    PRESENT       SCSI driver V1.0L00 [ERR1234:write error DEV-RAIDA001 filesize=1000 GB
    HARDWARE   PRESENT       SCSIA001   RAIDA001
    SOFTWARE   PRESENT       FILE SIZE>1 TB · DETAILS OF PHENOMENON       IF SCSI DRIVER V1.0 IS USED, WHEN A FILE OF A CAPACITY EXCEEDING 1 TB IS
                              WRITTEN USING A SCSI CARD MANUFACTURED BY COMPANY "A": SCSIA001 AND A
                              DISK ARRAY APPARATUS: RAIDA001, ERR1234 MAY OCCUR AND FILE WRITING MAY
                              FAIL.

· COUNTERMEASURE                                                      APPLY 2007001
· PREVENTATIVE MEASURE                                                NONE
· KEYWORD
· PATCH NUMBER (0 OR MULTIPLE ITEMS MAY BE DESCRIBED.)                NONE
· FAILURE DETECTION INFORMATION (CONFIDENTIAL INFORMATION: ENCRYPTED) NONE
```

800
PATCH DATA

- INTERNAL MANAGEMENT KEY NUMBER    0000001
- PATCH NUMBER    207001
- FAILURE NUMBER, TROUBLE MANAGEMENT NUMBER    N2007-01-0001
- OVERVIEW OF CONTENT OF CORRECTION    SCSI DRIVER IS CORRECTED TO AVOID FAILURES IN WRITING A FILE OF A CAPACITY EXCEEDING 1 TB, USING A DISK ARRAY APPARATUS: RAIDA001.

- SUMMARY OF PHENOMENON, DETAILS OF PHENOMENON
  IF SCSI DRIVER V1.0 IS USED, WHEN A FILE OF A CAPACITY EXCEEDING 1 TB IS WRITTEN USING A SCSI CARD MANUFACTURED BY COMPANY "A": SCSIA001 AND A DISK ARRAY APPARATUS: RAIDA001, ERR1234 MAY OCCUR AND FILE WRITING MAY FAIL.

- APPLICATION CONDITIONS, CONDITIONS OF PHENOMENON
- TYPE OF OS, VERSION NUMBER (MULTIPLE ITEMS CAN BE DESCRIBED.)    Solaris    V10
- NAME OF PROGRAM, VERSION NUMBER (MULTIPLE ITEMS CAN BE DESCRIBED.)    SCSI DRIVER    V1.0L00
  MESSAGE    PRESENT    SCSI driver V1.0L00 |ERR1234:write error DEV-RAIDA001 filesize=1000 GB
  HARDWARE    PRESENT    SCSIA001    RAIDA001
  SOFTWARE    PRESENT    FILE SIZE>1 TB

FIG.9

```
ANNOUNCED PATCH INFORMATION
· PATCH NUMBER    2007002
· FAILURE NUMBER  N2007-01-0002

· OVERVIEW OF CONTENT OF CORRECTION    SCSI DRIVER IS CORRECTED TO AVOID FAILURE WHEN
                                       SIMULTANEOUS WRITING OF FILES IS EXECUTED USING A DISK
                                       ARRAY APPARATUS: RAIDA001.

· SUMMARY OF PHENOMENON    IF SCSI DRIVER V1.0 IS USED, WHEN A FILE OF A CAPACITY EXCEEDING 1 TB IS
                           WRITTEN USING A SCSI CARD MANUFACTURED BY COMPANY "A": SCSIA001 AND A
                           DISK ARRAY APPARATUS: RAIDA001, ERR1234 MAY OCCUR AND FILE WRITING MAY
                           FAIL.

· APPLICATION CONDITIONS
 - TYPE OF OS, VERSION NUMBER (MULTIPLE ITEMS CAN BE DESCRIBED.)      Solaris      V10
 - NAME OF PROGRAM, VERSION NUMBER (MULTIPLE ITEMS CAN BE DESCRIBED.) SCSI DRIVER  V1.0L00
 - RELATED PATCH NUMBER (MULTIPLE ITEMS CAN BE DESCRIBED.)            NONE
 - OTHER INCIDENTAL CONDITIONS
   MESSAGE   PRESENT   SCSI driver V1.0L00 |ERR1000:write error DEV-RAIDA001 filesize=xx adrress=xx
   HARDWARE  PRESENT   SCSIA001   RAIDA001
   SOFTWARE  NONE
```

```
ANNOUNCED FAILURE INFORMATION
· TROUBLE MANAGEMENT NUMBER    N2007-01-0002

· SUMMARY OF PHENOMENON         IF SCSI DRIVER V1.0 IS USED, WHEN A FILE IS WRITTEN USING A SCSI CARD MANUFACTURED BY
                                COMPANY "A": SCSIA001 AND A DISK ARRAY APPARATUS: RAIDA001, ERR1000 MAY OCCUR AND
                                FILE WRITING MAY FAIL.

· CONDITIONS OF PHENOMENON
- TYPE OF OS, VERSION NUMBER (MULTIPLE ITEMS CAN BE DESCRIBED.)           Solaris            V10
- NAME OF PROGRAM, VERSION NUMBER (MULTIPLE ITEMS CAN BE DESCRIBED.)      SCSI DRIVER        V1.0L00
- RELATED PATCH NUMBER (MULTIPLE ITEMS CAN BE DESCRIBED.)                 NONE
- OTHER INCIDENTAL CONDITIONS
  MESSAGE   PRESENT          SCSI driver V1.0L00 |ERR1000:write error DEV-RAIDA001 filesize=xx adress=xx
  HARDWARE  PRESENT          RAIDA001
  SOFTWARE  NONE · DETAILS OF PHENOMENON         WHEN A REQUEST TO WRITE A FILE IS SIMULTANEOUSLY RECEIVED FROM 3 OR MORE
                                SOFTWARES UNDER THE ABOVE CONDITIONS, ERR1000 MAY OCCUR AND WRITING OF THE FILES
                                MAY FAIL.
· COUNTERMEASURE                APPLY 2007002
· PREVENTATIVE MEASURE          NONE
· KEYWORD
- PATCH NUMBER (0 OR MULTIPLE ITEMS MAY BE DESCRIBED.)
- FAILURE DETECTION INFORMATION (CONFIDENTIAL INFORMATION: ENCRYPTED)     PRESENT
- TYPE OF OS, VERSION NUMBER (MULTIPLE ITEMS CAN BE DESCRIBED.)           Solaris            V10
- NAME OF PROGRAM, VERSION NUMBER (MULTIPLE ITEMS CAN BE DESCRIBED.)      SCSI DRIVER        V1.0
- OTHER INCIDENTAL CONDITIONS
  MESSAGE   SCSI driver V1.0L00
  MESSAGE   ERR1000
  HARDWARE  SCSIA001
  LOG       and                CONDITION 1=10
  LOG       and                CONDITION 2=10
  LOG       and                COMMAND=10
  LOG                          RECOVERED VALUE=-1
  DUMP      NOT NECESSARY
```

```
                                                                                              1100
                                                                                                ⌇
· INTERNAL MANAGEMENT KEY NUMBER     0000002                                              PATCH DATA
· PATCH NUMBER                       2007002
· FAILURE NUMBER, TROUBLE MANAGEMENT NUMBER   N2007-01-0002
· OVERVIEW OF CONTENT OF CORRECTION  SCSI DRIVER IS CORRECTED TO AVOID FAILURE WHEN SIMULTANEOUS WRITING OF
                                     FILES IS EXECUTED USING A DISK ARRAY APPARATUS: RAIDA001.

· SUMMARY OF PHENOMENON              IF SCSI DRIVER V1.0 IS USED, WHEN A FILE IS WRITTEN USING A SCSI CARD MANUFACTURED BY
                                     COMPANY "A": SCSIA001 AND A DISK ARRAY APPARATUS: RAIDA001, ERR1234 MAY OCCUR AND
                                     FILE WRITING MAY FAIL.
· APPLICATION CONDITIONS, CONDITIONS OF PHENOMENON
· TYPE OF OS, VERSION NUMBER (MULTIPLE ITEMS CAN BE DESCRIBED.)    Solaris         V10
· NAME OF PROGRAM, VERSION NUMBER (MULTIPLE ITEMS CAN BE DESCRIBED.)  SCSI DRIVER  V1.0L00
· RELATED PATCH NUMBER (MULTIPLE ITEMS CAN BE DESCRIBED.)
· OTHER INCIDENTAL CONDITIONS
    MESSAGE        PRESENT           SCSI driver V1.0L00 |ERR1000:write error DEV-RAIDA001 filesize=xx adrress=xx
    HARDWARE       PRESENT           RAIDA001
    SOFTWARE       NONE              SCSIA001
· DETAILS OF PHENOMENON              WHEN A REQUEST TO WRITE A FILE IS SIMULTANEOUSLY RECEIVED FROM 3 OR MORE
                                     SOFTWARES UNDER THE ABOVE CONDITIONS, ERR1000 MAY OCCUR AND WRITING OF THE FILES
                                     MAY FAIL.
· FAILURE DETECTION INFORMATION (CONFIDENTIAL INFORMATION: ENCRYPTED)   PRESENT
· TYPE OF OS, VERSION NUMBER (MULTIPLE ITEMS CAN BE DESCRIBED.)    Solaris         V10
· NAME OF PROGRAM, VERSION NUMBER (MULTIPLE ITEMS CAN BE DESCRIBED.)  SCSI DRIVER  V1.0
· OTHER INCIDENTAL CONDITIONS
    MESSAGE        SCSI driver V1.0L00
    MESSAGE        ERR1000
    HARDWARE       SCSIA001
    LOG            and          CONDITION 1=10
    LOG            and          CONDITION 2=10
    LOG            and          COMMAND=10
    LOG                         RECOVERED VALUE=-1
    DUMP           NOT NECESSARY
```

FIG.12

```
ANNOUNCED PATCH INFORMATION
· PATCH NUMBER    2007003
· FAILURE NUMBER  N2007-01-0003                                    1200

· OVERVIEW OF CONTENT OF CORRECTION   FAULT OCCURS IN DISK ARRAY APPARATUS: RAIDA001 AND EVEN IF
                                      FILE WRITING HAS BEEN EXECUTED, FOR SCSI DRIVER 1.0 USING
                                      SCSI CARD MANUFACTURED BY COMPANY "A" AND DISK ARRAY
· SUMMARY OF PHENOMENON               APPARATUS: RAIDA001, UPON NOTIFICATION OF FAULTY DISK STATE
                                      BY DISK ARRAY APPARATUS RAIDA001, downcode=100 AND SYSTEM
                                      FAILURE OCCUR.

· APPLICATION CONDITIONS
· TYPE OF OS, VERSION NUMBER (MULTIPLE ITEMS CAN BE DESCRIBED.)     Solaris         V10
· NAME OF PROGRAM, VERSION NUMBER (MULTIPLE ITEMS CAN BE DESCRIBED.) SCSI DRIVER   V1.0L00
· RELATED PATCH NUMBER (MULTIPLE ITEMS CAN BE DESCRIBED.)
· OTHER INCIDENTAL CONDITIONS
  MESSAGE    PRESENT     SCSI driver V1.0L00 |ERR9901:write error DEV-RAIDA001
  HARDWARE   PRESENT     SCSIA001    RAIDA001
  SOFTWARE   NONE
```

FIG.13

ANNOUNCED FAILURE INFORMATION
· TROUBLE MANAGEMENT NUMBER    N2007-01-0003

· SUMMARY OF PHENOMENON         FOR SCSI DRIVER 1.0 USING SCSI CARD MANUFACTURED BY COMPANY "A" AND DISK ARRAY
                                APPARATUS: RAIDA001, UPON NOTIFICATION OF FAULTY DISK STATE BY DISK ARRAY
                                APPARATUS RAIDA001, downcode=100 AND SYSTEM FAILURE OCCUR · CONDITIONS OF PHENOMENON
 - TYPE OF OS, VERSION NUMBER (MULTIPLE ITEMS CAN BE DESCRIBED.)         Solaris          V10
 - NAME OF PROGRAM, VERSION NUMBER (MULTIPLE ITEMS CAN BE DESCRIBED.)    SCSI DRIVER      V1.0L00
 - RELATED PATCH NUMBER (MULTIPLE ITEMS CAN BE DESCRIBED.)               NONE
 - OTHER INCIDENTAL CONDITIONS
   MESSAGE       PRESENT     down code=100
                 PRESENT     SCSI driver V1.0L00 |ERR9901:write error DEV-RAIDA001
   HARDWARE      PRESENT     SCSIA001       RAIDA001
   SOFTWARE      NONE
· DETAILS OF PHENOMENON         ALTHOUGH SYSTEM FAILURE OCCURS IF THIS DRIVER WRITES TO FAULTY HARD DISK AND
                                SYSTEM FAILURE AT DISK ARRAY APPARATUS NEED NOT OCCUR EXCEPT IN FATAL CASES, DISK
                                ARRAY APPARATUS IRRESPECTIVE OF STATE OF COUNTERPART, SUFFERS UNCONDITIONAL
                                SYSTEM FAILURE.
· METHOD OF COPING WITH TROUBLE       APPLY 2007003
· AVOIDING MEASURE                    NONE
· KEYWORD
· PATCH NUMBER (0 OR MULTIPLE ITEMS CAN BE DESCRIBED.)                   NONE
· FAILURE DETECTION INFORMATION (CONFIDENTIAL INFORMATION: ENCRYPTED)    PRESENT
 - TYPE OF OS, VERSION NUMBER (MULTIPLE ITEMS CAN BE DESCRIBED.)         Solaris          V10
 - NAME OF PROGRAM, VERSION NUMBER (MULTIPLE ITEMS CAN BE DESCRIBED.)    SCSI DRIVER      V1.0
 - OTHER INCIDENTAL CONDITIONS
   MESSAGE       SCSI driver V1.0L00
   MESSAGE       ERR1000
   HARDWARE      SCSIA001
   LOG           and          CONDITION 1=9999
   LOG           and          CONDITION 2=0
   LOG           and          COMMAND=10
   LOG           and          RECOVERED VALUE=-2
   DUMP          and          down code=100
   DUMP          and          address=abcd000000001234

1400  PATCH DATA

- INTERNAL MANAGEMENT KEY NUMBER   0000003
- PATCH NUMBER   2007003
- FAILURE NUMBER, TROUBLE MANAGEMENT NUMBER   N2007-01-0003
- OVERVIEW OF CONTENT OF CORRECTION   FAULT OCCURS IN DISK ARRAY APPARATUS: RAIDA001 AND EVEN IF FILE WRITING HAS BEEN EXECUTED, FOR SCSI DRIVER 1.0 USING SCSI CARD MANUFACTURED BY COMPANY "A" AND DISK ARRAY APPARATUS: RAIDA001, UPON NOTIFICATION OF
- SUMMARY OF PHENOMENON   FAULTY DISK STATE BY DISK ARRAY APPARATUS RAIDA001, downcode=100 AND SYSTEM FAILURE OCCUR

- APPLICATION CONDITIONS, CONDITIONS OF PHENOMENON
- TYPE OF OS, VERSION NUMBER (MULTIPLE ITEMS CAN BE DESCRIBED.)   Solaris   V10
- NAME OF PROGRAM, VERSION NUMBER (MULTIPLE ITEMS CAN BE DESCRIBED.)   SCSI DRIVER   V1.0L00
- RELATED PATCH NUMBER (MULTIPLE ITEMS CAN BE DESCRIBED.)   NONE
- OTHER INCIDENTAL CONDITIONS
  MESSAGE   PRESENT   down code=100
           PRESENT   SCSI driver V1.0L00 |ERR9901:write error DEV-RAIDA001
           PRESENT   SCSIA001   RAIDA001
  HARDWARE   PRESENT
  SOFTWARE   NONE
- FAILURE DETECTION INFORMATION (CONFIDENTIAL INFORMATION: ENCRYPTED)   PRESENT
- TYPE OF OS, VERSION NUMBER (MULTIPLE ITEMS CAN BE DESCRIBED.)   Solaris   V10
- NAME OF PROGRAM, VERSION NUMBER (MULTIPLE ITEMS CAN BE DESCRIBED.)   SCSI DRIVER   V1.0
- RELATED PATCH NUMBER (MULTIPLE ITEMS CAN BE DESCRIBED.)
- OTHER INCIDENTAL CONDITIONS
  MESSAGE   SCSI driver V1.0L00
  MESSAGE   ERR1000
  HARDWARE   SCSIA001
  LOG       and   CONDITION 1=9999
  LOG       and   CONDITION 2=0
  LOG       and   COMMAND=10
  LOG       and   RECOVERED VALUE=-2
  DUMP      and   down code=100
  DUMP      and   address=abcd00000001234

FIG.15

PATCH APPLICATION INFORMATION  1500

- PATCH NUMBER                          2006001
- DATE AND TIME OF APPLICATION          2006/1/10 8:00:00
- NAME OF PROGRAM AND VERSION NUMBER    SCSI DRIVER V1.0L00
- NAME OF FILE                          SCSIDRV001
- LOG FOR TIME OF APPLICATION           NONE

· · · · · ·

- PATCH NUMBER                          2006301
- DATE AND TIME OF APPLICATION          2006/12/10 8:00:00
- NAME OF PROGRAM AND VERSION NUMBER    SCSI DRIVER V1.0L00
- NAME OF FILE                          SCSIDRV003
- LOG FOR TIME OF APPLICATION           NONE

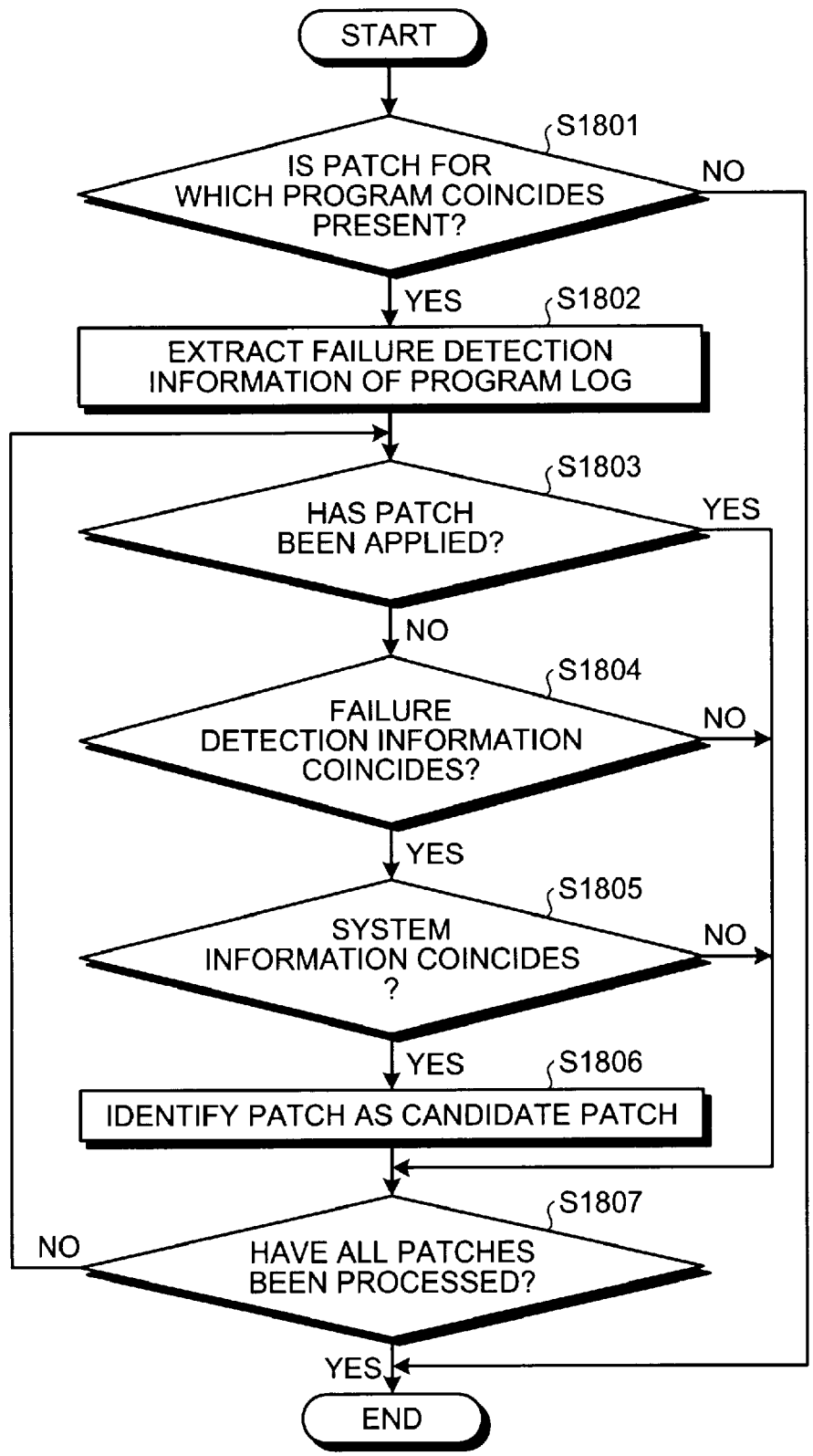

```
PROGRAM LOG
    TIME STAMP           2007/1/1 2:05:11
    DATA LENGTH          24
    TYPE OF LOG          10       (data write)
 1  REGISTER 1           99999900 (read data (last block))
 2  REGISTER 2           99999984 (write data (last block))
 3  REGISTER 3           00000000 (data address)
 4  REGISTER 4           00000063 (data length)
 5  REGISTER 5           00000010 (program-1)/CONDITION 1
 6  REGISTER 6           00000010 (program-2)/CONDITION 2
 7  REGISTER 7           00000010 (program-3)/COMMAND
 8  REGISTER 8           ffffffff (program-4)/RECOVERED VALUE
 9  INPUT Data 1         12345678 (last data)
10  INPUT Data 2         12345679
11  INPUT Data 3         12345680
12  INPUT Data 4         12345681
13  INPUT Data 5         12345682
14  INPUT Data 6         12345683
15  INPUT Data 7         99999900
16  INPUT Data 8         00000000
17  OUTPUT Data 1        12345678 (last data)
18  OUTPUT Data 2        12345679
19  OUTPUT Data 3        12345680
20  OUTPUT Data 4        12345681
21  OUTPUT Data 5        12345682
22  OUTPUT Data 6        12345683
23  OUTPUT Data 7        99999912
24  OUTPUT Data 8        34567890
```

| | |
|---|---|
| date & time | 2007/1/1 2:05:11 |
| size | 1GB |
| program name | scsi driver |
| address | abcd000000001234 |
| down code | 100 |
| REGISTER 1 | 99999900 (read data (last block)) |
| REGISTER 2 | 99999984 (write data (last block)) |
| REGISTER 3 | 00000000 (data address) |
| REGISTER 4 | 00000063 (data length) |
| REGISTER 5 | 00000010 (program-1)/CONDITION 1 |
| REGISTER 6 | 00000000 (program-2)/CONDITION 2 |
| REGISTER 7 | 00000010 (program-3)/COMMAND |
| REGISTER 8 | fffffffe (program-4)/RECOVERED VALUE |
| stack | abcd000000001234 |
| | abcd000000001235 |
| | abcd000000001236 |
| | abcd000000001237 |
| | abcd000000001238 |
| | abcd000000001239 |
| | abcd000000001240 |
| | abcd000000001241 |

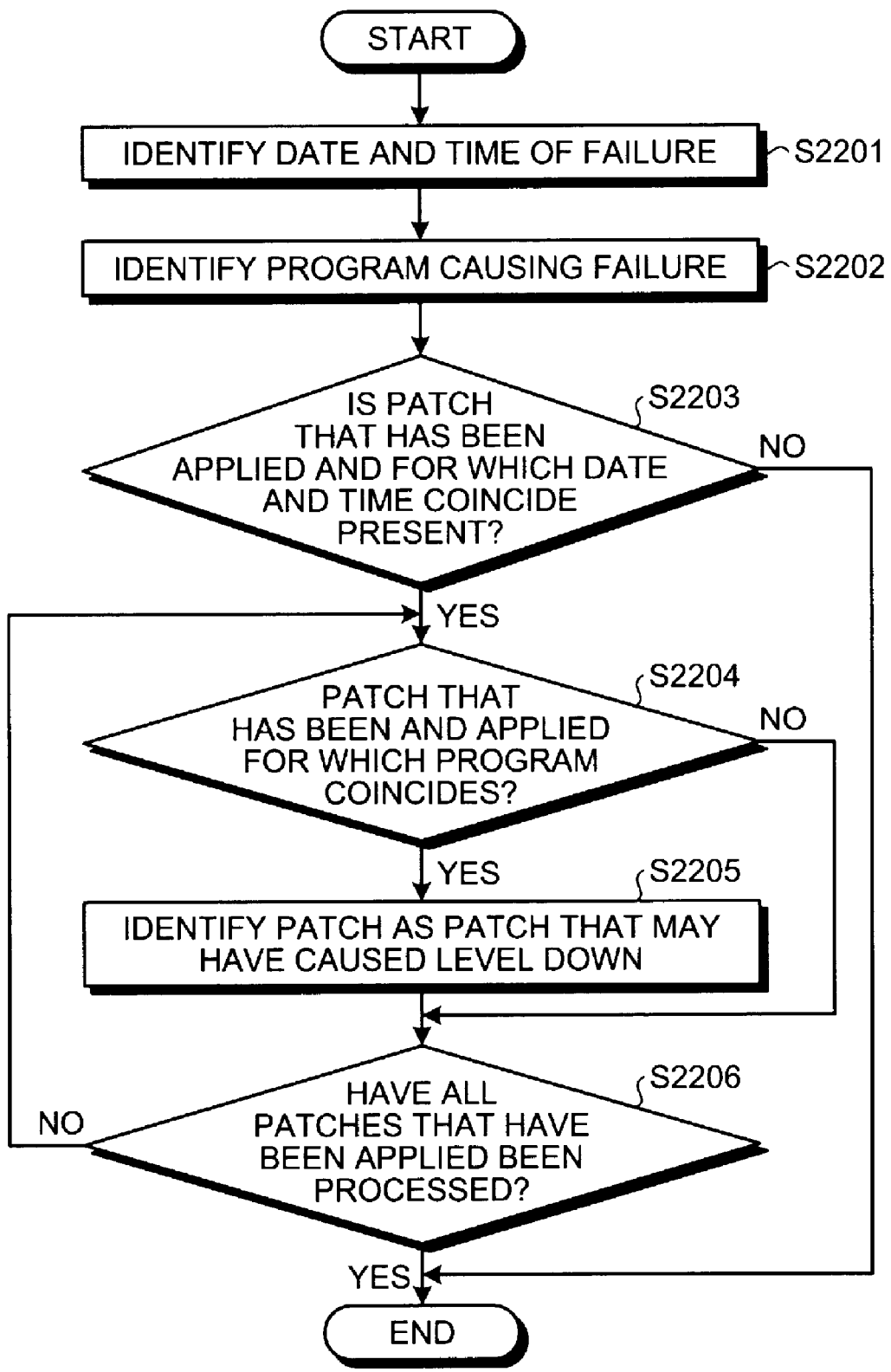

CANDIDATE-PATCH SELECTING APPARATUS, COMPUTER PRODUCT, AND METHOD

CROSS REFERENCE TO THE RELATED APPLICATIONS

This application is a continuation application of International Application PCT/JP2008/052995, filed Feb. 21, 2008, and designating the U.S., the entire contents of which are incorporated herein by reference.

FIELD

The embodiments discussed herein are related to selection of candidate patches for application to a computer.

BACKGROUND

Conventionally, patches, which vary according to program, i.e., programs installed in a computer, are provided to resolve failures that have occurred in or to prevent failures from occurring in the computer. A server managed by the vender of the programs installed in the computer provides patches. A computer on the client side downloads the patches through the Internet, etc., from a server providing the patches, and applies the patches.

A large number of patches are provided regardless of the scale of the failure and therefore, the selection of a patch appropriate for each computer is difficult. As a result, conventionally, all patches that a server is able to provide are downloaded and applied to a computer, or the work of searching for a proper patch, based on various types of information concerning the failure is commissioned to an expert. A technique is disclosed of identifying a patch, based on disclosed failure information (see, e.g., Japanese Laid-Open Patent Publication No. 2003-233512).

However, if all the patches are downloaded and applied to a computer, the process of downloading and applying each is time consuming and a problem arises in that the operation of the computer has to be discontinued for a long time. If more patches than necessary are applied, a problem further arises in that the possibility of an occurrence of a level-down (a secondary failure caused by a patch that has been applied) increases. For example, if all the patches are applied and a level-down occurs, a problem arises in that it is difficult to identify the patch that has caused the level-down, from among the large number of patches.

If the work of searching for a proper patch, based on various types of information concerning the failure is commissioned to an expert, problems arise in that the precision of selecting the patch may be low depending on the skill of the worker and even for a highly skilled worker, it is difficult to select patches if multiple patches have to be combined. Japanese Laid-Open Patent Publication No. 2003-233512 does not recite specifically what announced information is used and what process is used to identify the patch.

SUMMARY

According to an aspect of an embodiment, a candidate-patch selecting apparatus includes a detector configured to detect a failure of a computer; an obtaining unit configured to obtain record information for the computer, recorded at the time when the failure detected by the detector occurred; an extractor configured to extract from the record information obtained by the obtaining unit, information identifying the failure; an identifying unit configured to identify, based on a database that stores therein patches and respective selection conditions, a patch for which selection conditions are satisfied by the extracted information identifying the failure; and an output unit configured to output an identification result acquired by the identifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram of an example of system information for the computer.

FIG. 6 is a diagram of a first example of announced patch information.

FIG. 7 is a diagram of a first example of announced failure information.

FIG. 8 is a diagram of a first example of patch data.

FIG. 9 is a diagram of a second example of the announced patch information.

FIG. 10 is a diagram of a second example of the announced failure information.

FIG. 11 is a diagram of a second example of the patch data.

FIG. 12 is a diagram of a third example of the announced patch information.

FIG. 13 is a diagram of a third example of the announced failure information.

FIG. 14 is a diagram of a third example of the patch data.

FIG. 15 is a diagram of an example of patch application information.

FIG. 18 is a flowchart of an example of program log analysis depicted in FIG. 16.

FIG. 19 is a diagram of an example of a program log.

FIG. 21 is a diagram of an example of dump information.

FIG. 22 is a flowchart of an example of level-down analysis depicted in FIG. 16.

DESCRIPTION OF EMBODIMENTS

Preferred embodiments of the present invention will be explained with reference to the accompanying drawings.

Figure 1:
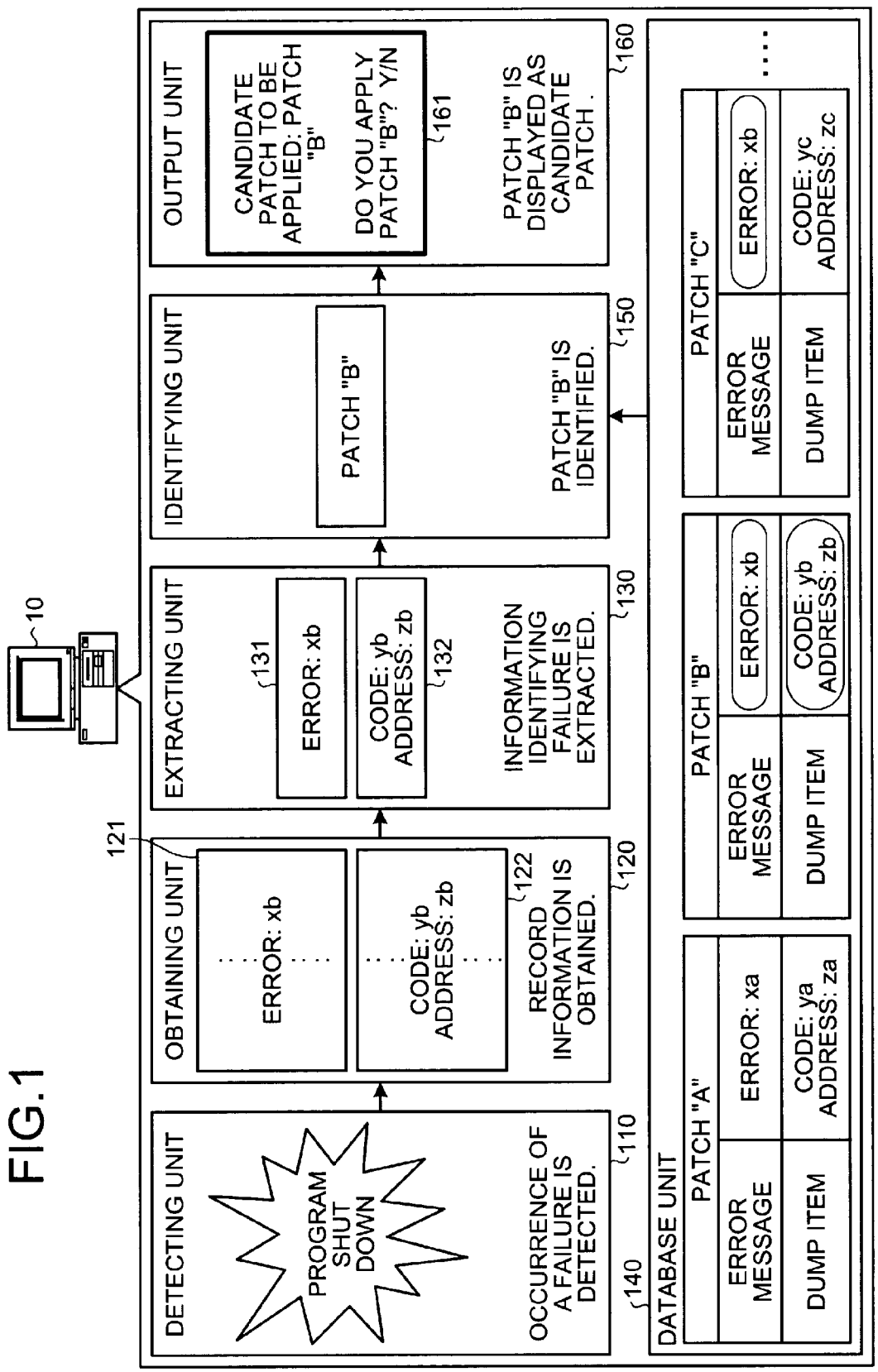
FIG. 1 is a schematic of a candidate-patch selecting apparatus according to an embodiment.

FIG. 1 is a schematic of a candidate-patch selecting apparatus according to an embodiment. As depicted in FIG. 1, a candidate-patch selecting apparatus 100 according the embodiment includes a detecting unit (detector) 110, an obtaining unit 120, an extractor (extractor) 130, a database unit (database) 140, an identifying unit 150, and an output unit 160.

The candidate-patch selecting apparatus 100 is applied to, for example, a computer 10 on the client side, which is provided patches from a server. The detecting unit 110 detects a failure that has occurred at the computer 10 such as the shutdown of a program executed by the computer 10. The obtaining unit 120 obtains record information for the computer 10, recorded when the shutdown of the program is detected by the detecting unit 110.

In the embodiment, the obtaining unit 120 obtains a system log 121 "... Error:xb ... " that is output when the program is shut down and dump information 122 " ... code:yb, address:zb ... " of a memory of the computer 10 for the time when the program is shut down, as the record information of the computer 10 recorded when the shutdown of the program is detected.

The extractor 130 extracts information identifying the failure, from the system log 121 and the dump information 122 that are obtained by the obtaining unit 120. In the embodiment, the extracting unit 130 extracts an error message 131 "Error:xb" from a message obtained by the obtaining unit 120. The extracting unit 130 further extracts a dump item 132 "code:yb, address:zb" from the dump information 122 obtained by the obtaining unit 120.

The database unit 140 stores therein a database storing patches A, B, C, ... and selection conditions for each of the patches A, B, C, .... The selection conditions refer to conditions to select a patch that corresponds to the failure of the computer, from among the patches A, B, C, .... In the embodiment, an error message and a dump item are stored as the selection conditions for each of the patches.

The database unit 140 stores therein, for example, an error message "Error:xa" and a dump item "code:ya, address:za" as selection conditions for the patch "A". The database unit 140 further stores therein an error message "Error:xb" and a dump item "code:yb, address:zb" as selection conditions for the patch "B". The database unit 140 further stores therein an error message "Error:xb" (identical to that of patch B) and a dump item "code:yc, address:zc" as selection conditions for the patch "C".

The identifying unit 150, based on the contents of the database stored in the database unit 140 and from among the patches A, B, C, ... , identifies a patch for which selection conditions are satisfied by the error message 131 and the dump item 132 extracted by the extracting unit 130. In the embodiment, the identifying unit 150 identifies the patch B for which selection conditions are satisfied by both the error message 131 "Error:xb" and the dump item 132 "code:yb, address:zb" that are extracted by the extracting unit 130.

The identifying unit 150 may identify a patch from among the patches A, B, C, ... that remain after excluding patches that have been applied to the computer 10. In this case, information that indicates whether a patch has been applied to the computer 10 is stored to the database unit 140 as a selection condition of the patch.

The identifying unit 150 may further identify a patch whose selection conditions coincide with items in system information of the computer 10. The system information of the computer 10 refers to information concerning the hardware configuration and the software configuration of the computer 10, etc. In this case, selection conditions concerning system information are stored to the database unit 140 as a selection condition of the patch.

If no patch is identified for which selection conditions are satisfied, the identifying unit 150 may identify a patch whose date and time of application coincide with the date and the time of the occurrence of the failure detected by the detecting unit 110, from among the patches that have been applied to the computer 10. In this case, information that indicates whether a patch has been applied to the computer 10 and information concerning the date and the time of the application to the computer 10 is stored to the database unit 140, as selection conditions of the patch.

The output unit 160 outputs the patch B that has been identified by the identifying unit 150 as a candidate patch for application. In the embodiment, as denoted by a reference numeral "161", the patch B is displayed on a display screen of the computer 10 as a candidate patch and an input (Y/N) instructing whether the patch B is to be applied is received from a user. If an input (Y) instructing that the patch B is to be applied is received from the user, the computer 10 downloads the patch B from the server providing the patch and applies the patch B to the computer 10.

If the identifying unit 150 identifies a patch for which the date and time of application coincide with the date and the time of occurrence of the failure, from among the patches that have been applied to the computer 10, the output unit 160 outputs the patch identified by the identifying unit 150 as a candidate level-down patch. For example, the candidate level-down patch is displayed on the display screen of the computer 10 and an input (Y/N) instructing whether the application of the patch is to be cancelled is received from the user. If an input (Y) instructing that the application of the patch is to be cancelled is received from the user, the computer 10 cancels application of the patch.

Figure 2:
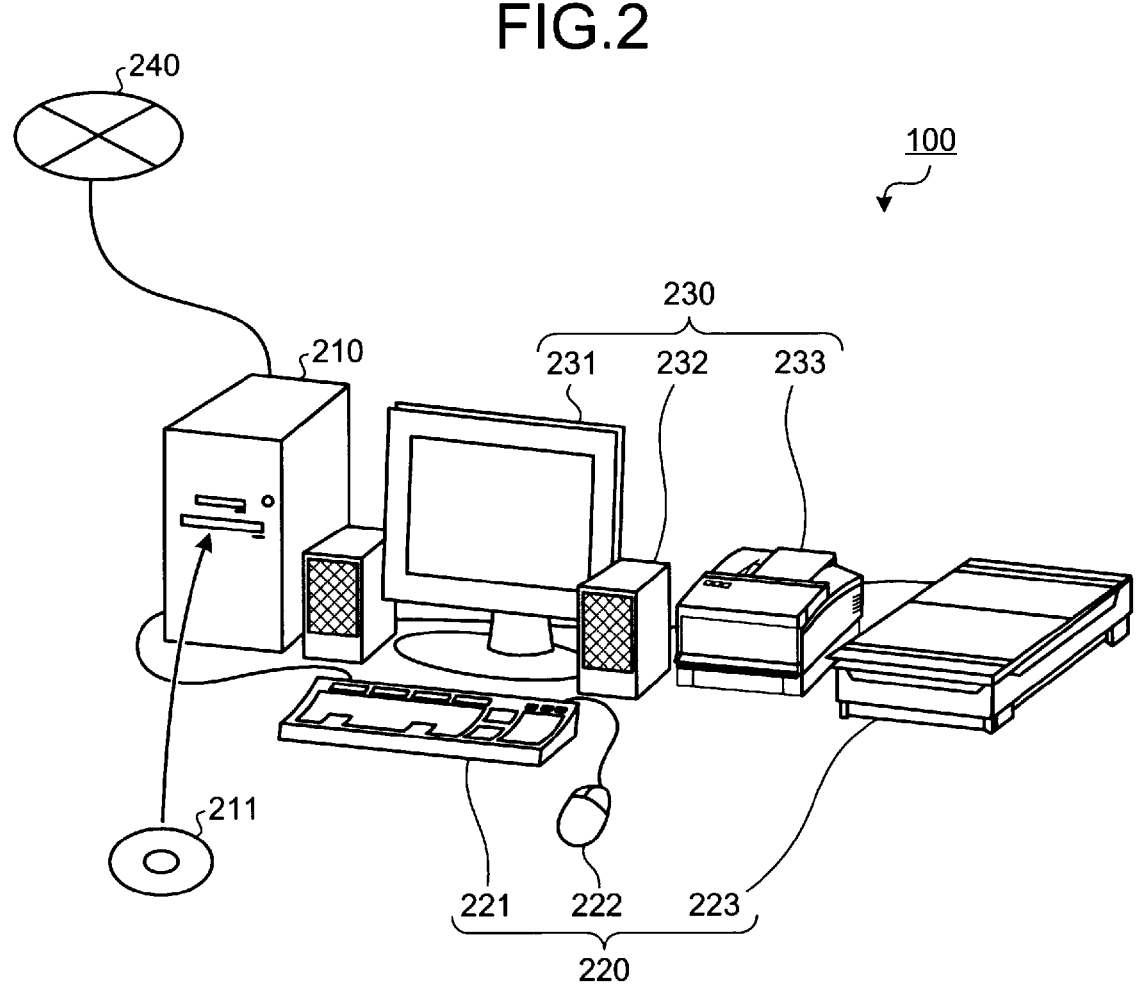
FIG. 2 is a block diagram of the candidate-patch selecting apparatus according to the embodiment.

FIG. 2 is a block diagram of the candidate-patch selecting apparatus according to the embodiment. As depicted in FIG. 2, a candidate-patch selecting apparatus 100 includes a computer 210, input devices 220, and output devices 230, and may be connected to a network 240, such as a local area network (LAN), a wide area network (WAN), and the Internet through a non-depicted router or a modem.

The computer 210 has a central processing unit (CPU), a memory, and an interface. The CPU governs overall control of the candidate-patch selecting apparatus 100. The memory includes read-only memory (ROM), random access memory (RAM), a hard disk (HD), an optical disk 211, and flash memory. The memory is used as a work area of the CPU.

The memory stores therein various programs that are loaded in response to a command from the CPU. The reading and the writing of data with respect to the HD and the optical disk 211 are controlled by a disk drive. The optical disk 211 and the flash memory are removable from the computer 210. The interface controls input from the input device 220, output to the output device 230, and transmission/reception with respect to the network 240.

A keyboard 221, a mouse 222, and a scanner 223 are adopted as the input devices 220. The keyboard 221 includes keys to input, for example, characters, numeric figures, and various kinds of instructions, and data is input through the keyboard 221. The keyboard 221 may be a touch panel. The mouse 222 is used to move a cursor, select a range, move a window, or change window size. The scanner 223 optically reads an image as image data, which is stored in the memory of the computer 210. The scanner 223 may have an optical character recognition (OCR) function.

A display 231, a speaker 232, a printer 233, etc. are adopted as the output devices 230. The display 231 displays a cursor, an icon, or a tool box as well as data, such as text, an image, and function information. The speaker 232 outputs sound, e.g., a sound effect or text-to-voice converted sound. The printer 233 prints image data or text data.

Figure 3:
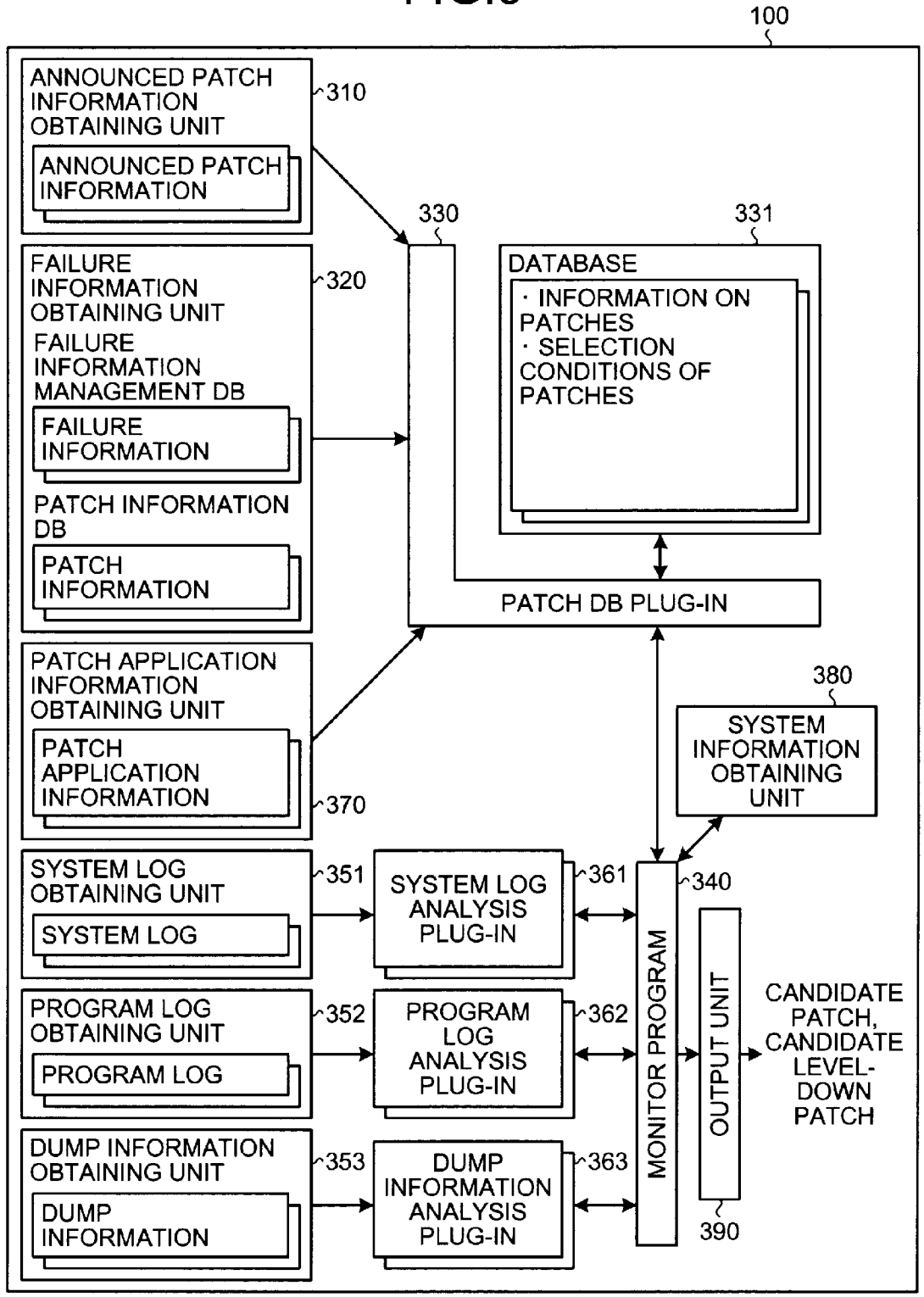
FIG. 3 is a block diagram of the functional configuration of the candidate-patch selecting apparatus according to the embodiment.

FIG. 3 is a block diagram of the functional configuration of the candidate-patch selecting apparatus according to the embodiment. As depicted in FIG. 3, the candidate-patch selecting apparatus 100 includes a patch information obtaining unit 310, a failure information obtaining unit 320, a patch DB plug-in 330, a monitor program 340, a system log obtaining unit 351, a program log obtaining unit 352, a dump information obtaining unit 353, a system log analysis plug-in 361, a program log analysis plug-in 362, a dump-information analysis plug-in 363, a patch application information obtaining unit 370, and a system information obtaining unit 380.

These functions 310 to 380 may be implemented by causing a CPU to execute a program related the functions 310 to 380 and stored in a storage unit of the candidate-patch selecting apparatus 100 or via an input/output I/F.

Data output from each of the functions 310 to 380 is retained in the above storage unit. In FIG. 3, a function that is the connection destination indicated by an arrowhead reads from the storage unit, data output from another function that is the corresponding connection origin, and causes the CPU to execute the program related to the function.

The patch information obtaining unit 310 obtains announced patch information from the server providing the patches, etc. The announced patch information is information concerning the patches that the server may provide and an explanation of each of the patches. The patch information obtaining unit 310 outputs the announced patch information obtained to the patch DB plug-in 330.

The announced patch information includes information such as, for example, patch numbers to identify patches, an overview of the program corrections by each patch, a summary of phenomena addressed by each patch, and application conditions for each patch. Application conditions for a patch include, for example, the type and the version number of an OS, the name and the version number of a program, related patch numbers, and other incidental conditions. Failure detection information is usually encrypted and the patch information obtaining unit 310 decrypts and obtains such failure detection information.

The failure information obtaining unit 320 obtains an announced-failure-information management DB and a patch information DB. The announced-failure-information management DB and the patch information DB are databases of information concerning trouble and patches related to the hardware and the software of the computer 10. The failure information obtaining unit 320 obtains the announced-failure-information management DB and the patch information DB from a server that is managed by the manufacturer of the hardware and the software of the computer 10, etc.

The failure information obtaining unit 320 outputs the databases obtained to the patch DB plug-in 330. The announced-failure-information management DB includes trouble management numbers to identify failures, summaries or details of the phenomena of the troubles, occurrence conditions for the phenomena of the troubles, methods to cope with the troubles, measures to avoid the troubles, keywords to search for the troubles, patch numbers representing patches that cope with the troubles, failure detection information, etc.

The patch information DB includes patch numbers to identify the patches, summaries or details of the contents of correction of the program by the patches, summaries or details of phenomena that need application of the patches, conditions for the occurrence of phenomena addressed by the patches, methods of coping with the trouble addressed by the patches, measures to avoid the trouble addressed by the patches, keywords to search for the patches, information concerning failure detection of trouble addressed by the patches, etc. The information concerning failure detection stored in the announced-failure-information management DB and the patch information DB is usually encrypted and the failure information obtaining unit 320 decrypts and obtains such failure detection information.

The patch DB plug-in 330 creates a database 331 based on the announced patch information that is output from the patch information obtaining unit 310, and the announced-failure-information management DB and the patch information DB that are output from the failure information obtaining unit 320. The database 331 corresponds to the database unit 140 of FIG. 1. The database 331 stores therein patch data that corresponds to each differing patch. The patch data includes information concerning the corresponding patch and the selection conditions for selecting the corresponding patch.

The patch DB plug-in 330 may add to the patch data of the database 331, information concerning the application to the computer 10, based on patch application information output from the patch application information obtaining unit 370. The information concerning the application to the computer 10 refers to information indicating whether the patch has been applied to the computer 10 and, if the patch has been applied, further refers to information indicating the date and the time of application as well as the program to which the patch was applied.

The monitor program 340 corresponds to the functions of the detecting unit 110 and the identifying unit 150 that are depicted in FIG. 1. The monitor program 340 detects a failure of the computer 10. A failure of the computer 10 is, for example, a system error of the computer 10, or a shutdown of a program installed in the computer 10. The monitor program 340 detects a failure based on, for example, the announced failure information output from the system log analysis plug-in 361, the program log analysis plug-in 362, and the dump-information analysis plug-in 363.

If the monitor program 340 detects a failure of the computer 10, the monitor program 340 obtains information to identify the failure, output from the system log analysis plug-in 361, the program log analysis plug-in 362, and the dump-information analysis plug-in 363, and identifies in the database 331, a patch for which selection conditions are satisfied by the information obtained. Thereby, a patch corresponding to the failure that has occurred in the computer 10 is automatically selected from the database 331.

If no patch for which selection conditions are satisfied by the information identifying the failure is identified in the database 331, a patch whose date and time of application to the computer 10 coincide with the date and the time of the occurrence of the failure may be identified as a patch that may have caused a level-down, from among the patches that have been applied to the computer 10. Thereby, a patch that may have caused the level-down is automatically selected from among the patches that have been applied to the computer 10.

Information indicating the patches that have been applied to the computer 10 and the date and the time of the application of the patch may be obtained from the patch application information output from the database 331 and the patch application information obtaining unit 370. The monitor program 340 outputs to the output unit 390, information concerning the identified candidate patches for application or the patches that may have caused the level-down.

The system log obtaining unit 351, the program log obtaining unit 352, and the dump information obtaining unit 353 correspond to the function of the obtaining unit 120 depicted in FIG. 1. The system log obtaining unit 351 obtains a system log of the computer 10. A system log is a log of system messages of the computer 10. The system log obtaining unit 351 outputs the system log obtained to the system log analysis plug-in 361.

The program log obtaining unit 352 obtains a program log for programs that are installed in the computer 10. A program log is a log of operations of a program. The program log obtaining unit 352 obtains a program log for each program operating on the computer 10. The system log obtaining unit 351 outputs the program log obtained to the program log analysis plug-in 362.

The dump information obtaining unit 353 accumulates dump information of a memory that is included in the computer 10. A "memory" herein refers to a memory that is used as a working area to execute the programs such as a RAM that is included in the computer 10. When the computer 10 includes a plurality of such memories, the dump information obtaining unit 353 accumulates the dump information for each memory. The dump information obtaining unit 353 outputs the dump information obtained to the dump-information analysis plug-in 363.

The system log analysis plug-in 361, the program log analysis plug-in 362, and the dump-information analysis plug-in 363 output to the monitor program 340, the announced failure information, based on the information output from the system log obtaining unit 351, the program log obtaining unit 352, and the dump information obtaining unit 353. The system log analysis plug-in 361, the program log analysis plug-in 362, and the dump-information analysis plug-in 363 correspond to the function of the extracting unit depicted in FIG. 1.

The system log analysis plug-in 361 extracts an error message from a system log concerning the time when the monitor program 340 detects the failure of the computer 10, among system logs output from the system log obtaining unit 351. The system log analysis plug-in 361 outputs the error message extracted to the monitor program 340.

The program log analysis plug-in 362 extracts failure detection information from a program log concerning the time when the monitor program 340 detects the failure of the computer 10, among program logs output from the program log obtaining unit 352. The program log analysis plug-in 362 outputs to the monitor program 340, the extracted failure detection information.

The dump-information analysis plug-in 363 extracts failure detection information from the dump information concerning the time when the monitor program 340 detects the failure of the computer 10, included in the dump information output from the dump information obtaining unit 353. The dump-information analysis plug-in 363 outputs to the monitor program 340, the failure detection information of the dump information extracted.

The patch application information obtaining unit 370 obtains the patch application information concerning the computer 10. Patch application information is information concerning the patches that have been applied to the computer 10. The patch application information includes information such as the patch numbers identifying the patches that have been applied to the computer 10, the date and the time of application of each of the patches, and the programs for which a patch has been applied. The patch application information obtaining unit 370 updates the patch application information each time a patch is applied to the computer 10 and outputs the updated patch application information to the patch DB plug-in 330.

The system information obtaining unit 380 obtains the system information of the computer 10. The system information is information concerning hardware included in the computer 10 and information concerning software that is installed in the computer 10. The system information obtaining unit 380 outputs the system information obtained to the monitor program 340.

The output unit 390 corresponds to a function of the output unit 160 depicted in FIG. 1. The output unit 390 displays a candidate patch that is to be applied and has been identified by the monitor program 340 on, for example, the display 231 depicted in FIG. 2 (see reference numeral "161" of FIG. 1). The output unit 390 displays on the display 231, a candidate level-down patch identified by the monitor program 340. The output unit 390 may also display multiple candidate patches for application or multiple candidate level-down patches.

When the candidate patch for application is displayed by the output unit 390, a user inputs, using, for example, the keyboard 221 or the mouse 222 depicted in FIG. 2, an instruction as to whether the candidate patch for application that is displayed is to be applied to the computer 10. When the computer 10 receives an input instructing that the candidate patch for application is to be applied, the computer 10 downloads the candidate patch for application and applies the patch to the computer 10.

When the output unit 390 displays the candidate level-down patch, the user inputs, using, for example, the keyboard 221 or the mouse 222 depicted in FIG. 2, an instruction indicating whether the application of the candidate level-down patch displayed is to be cancelled.

When the computer 10 receives an input instructing that the application of the candidate level-down patch is cancelled, the computer 10 cancels the candidate level-down patch for which the computer 10 receives the input instructing to cancel, in the computer 10 itself.

When plural candidate patches for application are displayed by the output unit 390, the user may input an instruction indicating that a candidate patch is selectively applied, among the plural candidate patches for application. When plural candidate level-down patches are displayed by the output unit 390, the user may input an input instructing that the application of a candidate level-down patch among the plural candidate level-down patches is selectively cancelled.

Alternatively, the output unit 390 does not display the candidate patch for application or the candidate level-down patch to the user and may output to the computer 10, an instruction instructing that the candidate patch has to be applied or an instruction instructing that the candidate level-down patch has to be cancelled. When the output unit 390 outputs the instruction instructing that the candidate patch for application has to be applied, the computer 10 downloads the candidate patch for application from the server that provides the patches, and applies the downloaded patch to the computer 10.

When the output unit 390 outputs the instruction instructing that the candidate level-down patch has to be cancelled, the computer 10 cancels the candidate level-down patch in the computer 10. In this case, the determination by the user is not followed and the application of the candidate patch for application or the cancellation of the candidate level-down patch identified by the monitor program 340 is automatically be executed.

Figure 4:
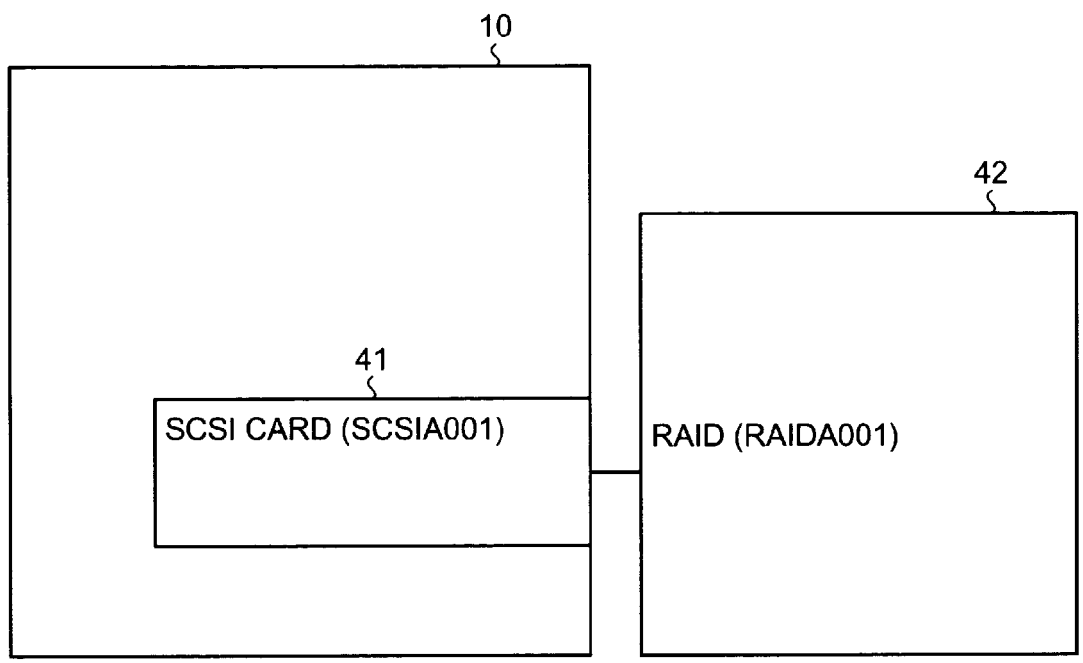
FIG. 4 is a block diagram of an example of a hardware configuration of a computer.

FIG. 4 is a block diagram of an example of a hardware configuration of the computer. As depicted in FIG. 4, the computer 10 includes a SCSI card 41 (identification name: "SCSIA001") and a RAID 42 (identification name: "RAIDA001"). The RAID 42 is provided external to the main body of the computer 10 and is connected through the SCSI card 41 that is provided for the main body of the computer 10.

It is assumed hereinafter that the computer 10 includes the SCSI card 41 and the RAID 42.

FIG. 5 is a diagram of an example of system information for the computer. The system information obtaining unit 380 obtains system information such as that denoted by a reference numeral "500" of FIG. 5. The system information 500 includes the date and the time of update of the system information 500, information concerning the hardware and the software of the computer 10, etc. In the embodiment, the system information 500 includes the type of OS "Solaris" of the computer 10 and the version number "V10" thereof.

The system information 500 includes information indicating the identification name "SCSIA001" of the SCSI card 41 and the identification name "RAIDA001" of the RAID 42 that are depicted in FIG. 4, as the information concerning the hardware of the computer 10. The system information 500 further includes the name of the program "SCSI driver" of the driver for the SCSI card 41 and the version number "V1.0L00" thereof, as the information concerning the software of the computer 10.

FIG. 6 is a diagram of a first example of the announced patch information. Announced patch information 600 of FIG. 6 represents the first example of the announced patch information that the patch information obtaining unit 310 obtains. The announced patch information 600 includes information such as an overview of the content of correction of a program by the patch, a summary of the phenomenon to which the patch is applicable, and application conditions of the patch, in addition to "2007001" as the patch number and "N2007-01-0001" as the failure number.

FIG. 7 is a diagram of a first example of the announced failure information. Announced failure information 700 depicted in FIG. 7 represents the first example of the announced failure information that the failure information obtaining unit 320 obtains. The announced failure information 700 includes a summary or the details of a phenomenon of trouble, occurrence conditions for the phenomenon of trouble, details of the phenomenon, countermeasure for coping with the trouble, preventative measures to avoid the trouble, keywords to search for the trouble, the patch number representing the patch that addresses with the trouble, the failure detection information, etc., in addition to "N2007-01-001" as the trouble management number.

FIG. 8 is a diagram of a first example of the patch data. Patch data 800 of FIG. 8 represents the first example of the patch data stored in the database 331. "N2007-01-0001" included as a failure number in the announced patch information 600 depicted in FIG. 6 and "N2007-01-0001" included as a trouble management number in the announced failure information 700 depicted in FIG. 7 coincide with each other and therefore, the patch DB plug-in 330 creates the patch data 800 by correlating the announced patch information 600 and the announced failure information 700.

In the embodiment, an example is described where the announced patch information 600 and the announced failure information 700 are correlated with each other based on the failure number and the trouble management number. However, the announced patch information 600 and the announced failure information 700 may be correlated based not only on the failure number and the trouble management number but also on "APPLY 2007001" as a countermeasure that is included in the announced failure information 700 and "2007001" as the patch number included in the announced patch information 600.

FIG. 9 is a diagram of a second example of the announced patch information. Announced patch information 900 of FIG. 9 represents the second example of the announced patch information that the patch information obtaining unit 310 obtains. The announced patch information 900 includes information similar to that included in the announced patch information 600. The patch number of the announce patch information 900 is "2007002" and the failure number is "N2007-01-0002".

FIG. 10 is a diagram of a second example of the announced failure information. Announced failure information 1000 depicted in FIG. 10 represents the second example of the announced failure information that the failure information obtaining unit 320 obtains. The announced failure information 1000 includes information similar to that included in the announced failure information 700. The trouble management number of the announce failure information 1000 is "N2007-01-0002" and "SCSI driver V1.0L00" is included as failure detection information of the program log.

FIG. 11 is a diagram of a second example of the patch data. Patch data 1100 of FIG. 11 represents the second example of the patch data stored in the database 331. "N2007-01-0002" included as a failure number in the announced patch information 900 depicted in FIG. 9 and "N2007-01-0002" included as a trouble management number in the announced failure information 1000 depicted in FIG. 10 coincide with each other and therefore, the patch DB plug-in 330 creates the patch data 1100 by correlating the announced patch information 900 and the announced failure information 1000.

FIG. 12 is a diagram of a third example of the announced patch information. Announced patch information 900 of FIG. 12 represents the third example of the announced patch information that the patch information obtaining unit 310 obtains. The announced patch information 1200 includes information similar to that included in the announced patch information 600. The patch number of the announce patch information 900 is "2007003" and the failure number is "N2007-01-0003".

FIG. 13 is a diagram of a third example of the announced failure information. Announced failure information 1300 depicted in FIG. 13 represents the third example of the announced failure information that the failure information obtaining unit 320 obtains. The announced failure information 1300 includes information similar to that included in the announced failure information 700. The trouble management number of the announce failure information 1300 is "N2007-01-0003" and "address abcd000000001234" and "down code 100" are included as failure detection information, which is dump information.

FIG. 14 is a diagram of a third example of the patch data. Patch data 1400 of FIG. 14 represents the third example of the patch data stored in the database 331. "N2007-01-0003" included as a failure number in the announced patch information 1200 depicted in FIG. 12 and "N2007-01-0003" included as a trouble management number in the announced failure information 1300 depicted in FIG. 13 coincide with each other and therefore, the patch DB plug-in 330 creates the patch data 1400 by correlating the announced patch information 1200 and the announced failure information 1300.

FIG. 15 is a diagram of an example of the patch application information. The patch application information 1500 of FIG. 15 represents the example of the patch application information that the patch application information obtaining unit 370 obtains. The patch application information 1500 includes, for example, information indicating that the patch having the patch number "2006001" is applied at 8:00 on Jan. 10, 2006, and information concerning the name of the program to which the patch is applied and the version number thereof.

Figure 16:
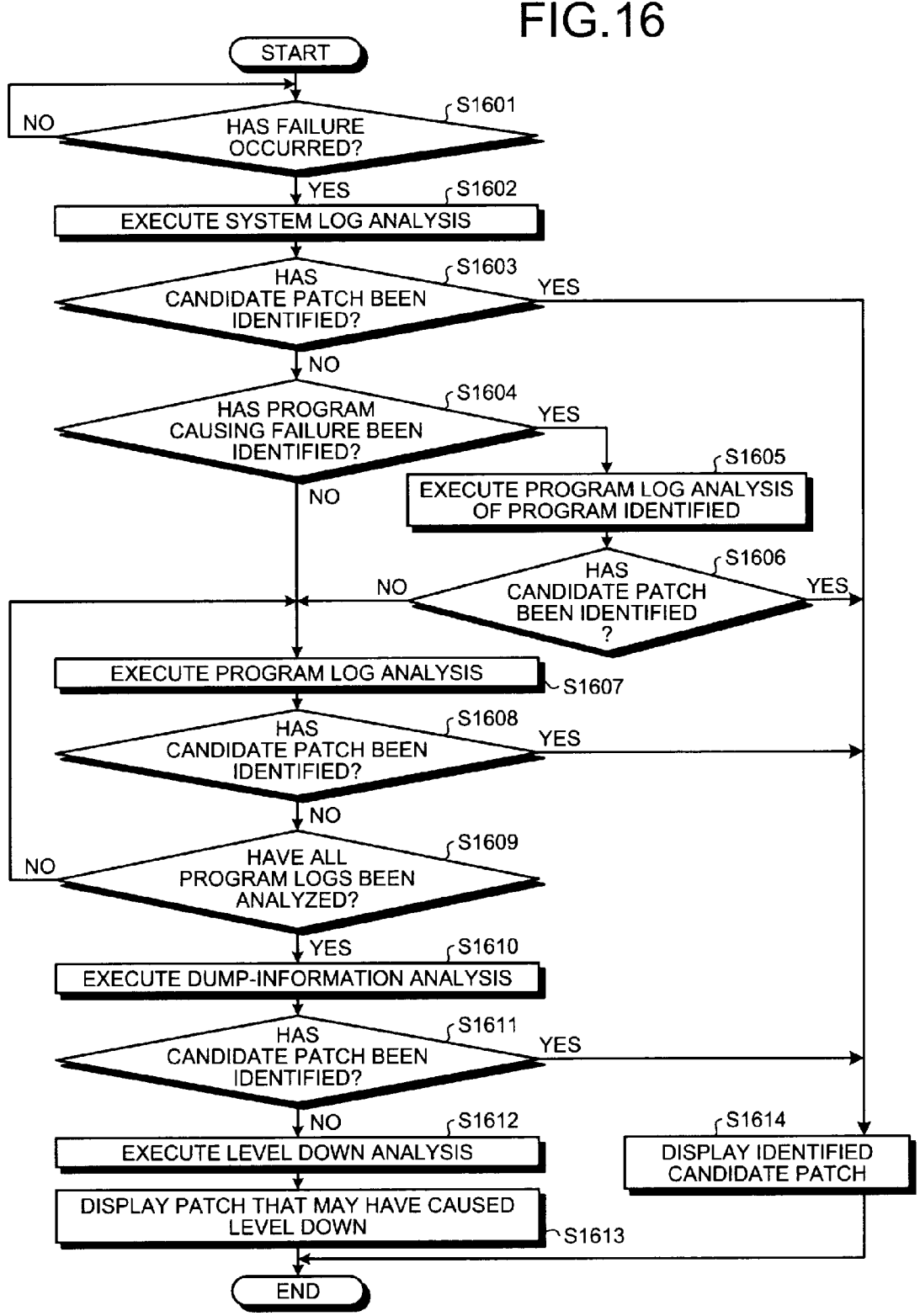
FIG. 16 is a flowchart of an example of operations of the candidate-patch selecting apparatus.

FIG. 16 is a flowchart of an example of operations of the candidate-patch selecting apparatus. As depicted in FIG. 16, the monitor program 340 first determines whether a failure has occurred at the computer 10, based on the analysis information output from the system log analysis plug-in 361, the program log analysis plug-in 362, and the dump-information analysis plug-in 363 (step S1601). If it is determined that no failure has occurred, the occurrence of a failure is waited for (step S1601: NO).

At step S1601, if it is determined that a failure has occurred (step S1601: YES), the system log analysis plug-in 361 and the monitor program 340 execute system log analysis based on the system log output from the system log obtaining unit 351 (step S1602, see FIG. 17). It is determined whether a candidate patch for application has been identified by the system log analysis executed at step S1602 (step S1603).

At step S1603, if it is determined that a candidate patch has been identified (step S1603: YES), operation proceeds to step S1614 and continues. If it is determined that no candidate patch has been identified (step S1603: NO), it is determined whether the program causing the occurrence of the failure has been identified (step S1604). The program causing the occurrence of the failure is identified based on, for example, the system log obtained at step S1602.

At step S1604, if it is determined that the program causing the occurrence of the failure has been identified (step S1604: YES), the program log analysis plug-in 362 and the monitor program 340 execute a program log analysis of the program that has caused the occurrence of the failure (step S1605, see FIG. 18).

The program log analysis is executed by the program log analysis plug-in 362 and the monitor program 340, based on the program log output from the program log obtaining unit 352. It is determined whether a candidate patch for application has been identified by the program log analysis executed at step S1605 (step S1606). If it is determined that a candidate patch for application has been identified (step S1606: YES), operation proceeds to step S1614.

If it is determined at step S1604 that no program has been identified (step S1604: NO) or if it is determined at step 1606 that no candidate patch for application has been identified (step S1606: NO), a program log analysis is executed for one program among the programs installed in the computer 10 (step S1607, see FIG. 18).

At step S1607, the program log analysis is executed by the program log analysis plug-in 362 and the monitor program 340, based on the program log output from the program log obtaining unit 352. It is determined whether a candidate patch for application has been identified by the program log analysis executed at step S1607 (step S1608).

At step S1608, if it is determined that a candidate patch for application has been identified (step S1608: YES), operation proceeds to step S1614 and continues. If it is determined that no candidate patch for application has been identified (step S1608: NO), it is determined whether the program log analysis at step S1607 has been executed for each of the programs installed in the computer 10 (step S1609).

At step S1609, if it is determined that the program log analysis has not executed for each of the programs (step S1609: NO), operation returns to step S1607 and program log analysis is executed for each program whose program logs have not been analyzed. At step S1609, if it is determined that the program log analysis has been executed for each of the programs (step S1609: YES), the dump-information analysis plug-in 363 and the monitor program 340 execute dump-information analysis (step S1610).

It is determined whether a candidate patch for application has been identified by the dump-information analysis executed at step S1610 (step S1611). If it is determined that a candidate patch has been identified (step S1611: YES), operation procedure proceeds to step S1614 and continues. If it is determined that no candidate patch has been identified (step S1611: NO), the monitor program 340 executes level-down analysis based on the patch application information (step S1612).

The patch identified by the level-down analysis executed at step S1612 is displayed as a patch that may have caused the level down (step S1613) and a series of operations comes to an end. If a candidate patch is identified at step S1603, S1606, S1608, or S1611, the identified candidate patch is displayed (step S1614) and a series of operations comes to an end.

Figure 17:
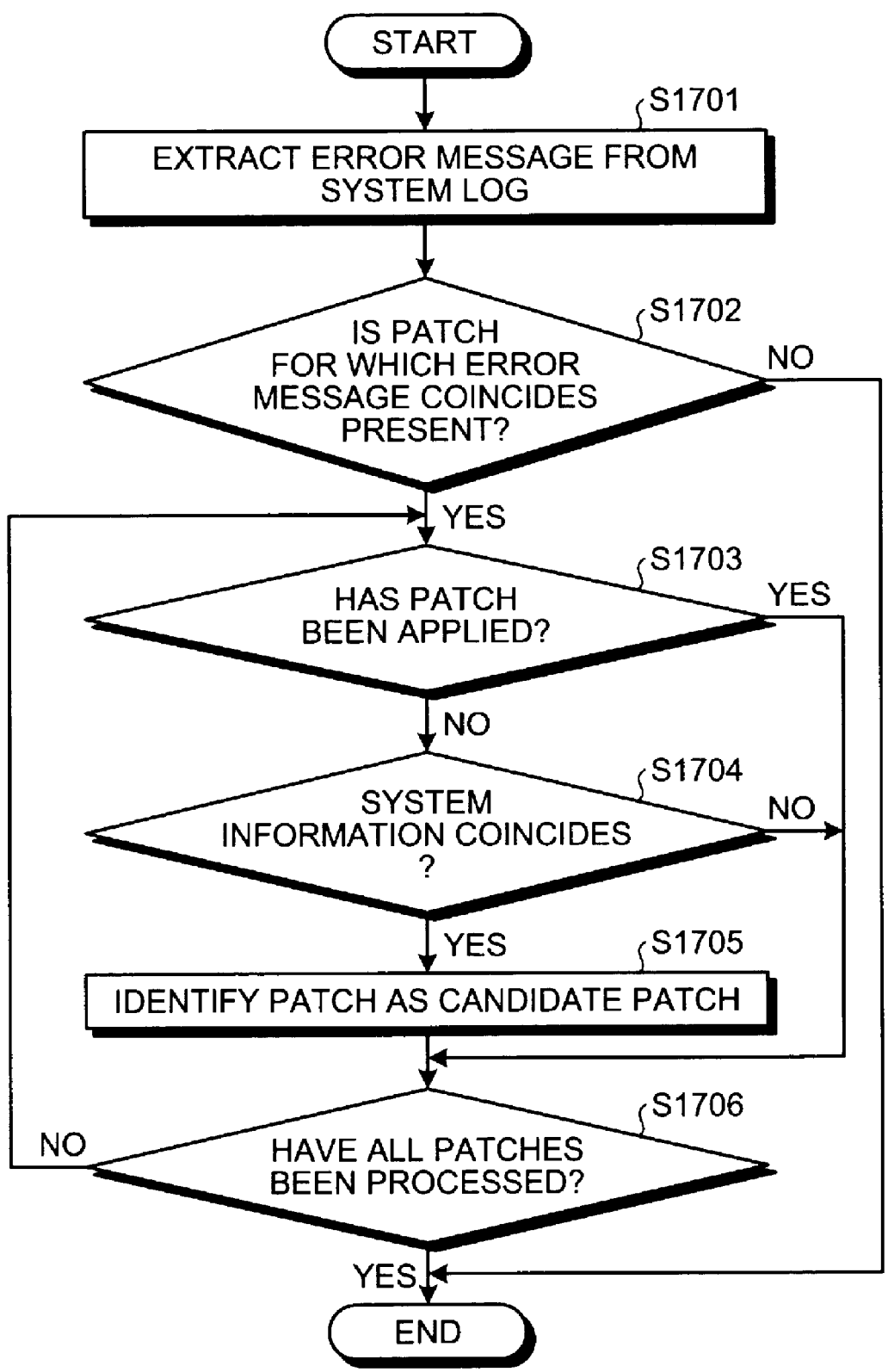
FIG. 17 is a flowchart of an example of system log analysis depicted in FIG. 16.

FIG. 17 is a flowchart of an example of the system log analysis depicted in FIG. 16. At step S1602 of FIG. 16, system log analysis such as that depicted in FIG. 17 is executed based on the system log output from the system log obtaining unit 351. The system log analysis plug-in 361 first extracts an error message from the system log output from the system log obtaining unit 351 (step S1701).

The monitor program 340 determines whether a patch having an error message that is included in the selection conditions and that coincides with the error message extracted at step S1701 is present in the database 331 (step S1702). If the monitor program 340 determines that no patch having an error message that coincides is present (step S1702: NO), the system log analysis comes to an end.

At step S1702, if the monitor program 340 determines that a patch having an error message that coincides is present (step S1702: YES), with respect to one of the patches, among the patches having an error message that coincides, it is determined whether the patch has been applied to the computer 10 (step S1703). At step S1703, it is determined whether the patch has been applied to the computer 10 by referring to the patch application information obtained from the patch application information obtaining unit 370 through the patch DB plug-in 330.

At step S1703, if it is determined that the patch has been applied to the computer 10 (step S1703: YES), operation proceeds to step S1706 and continues. If it is determined that the patch has not been applied to the computer 10 (step S1703: NO), it is determined whether the system information included in the selection conditions of the patch coincides with the system information of the computer 10 in the database (step S1704). At step S1704, coincidence of the system information is determined based on the system information that is output from the system information obtaining unit 380.

If it is determined at step S1704 that the system information does not coincide (step S1704: NO), operation proceeds to step S1706 and continues. If it is determined that the system information coincides (step S1704: YES), the patch is identified as a candidate patch for application (step S1705). It is determined whether each of the patches, for which the error messages are determined to coincide at step S1702, has been processed at step S1703 (step S1706).

At step S1706, if it is determined that each the patches has not been processed (step S1706: NO), operation returns to step S1703, and among the patches for which error messages have been determined to coincide at step S1702, patches that have not been processed at step S1703 are processed. If it is determined that each of the patches has been processed (step S1706: YES), the system log analysis comes to an end.

At the above steps, if the system log output from the system log obtaining unit 351 is " . . . ERR1234 . . . ", an error message "ERR1234" is extracted at step S1701. The error message "ERR1234" coincides with, for example, an error message included in the selection conditions of the patch data 800 depicted in FIG. 8 and therefore, a patch that corresponds to the patch data 800 is detected at step S1702.

The patch number of this patch is "2007001" as indicated in the patch data 800. The patch application information 1500 depicted in FIG. 15 includes no information indicating that a patch having the patch number "2007001" has been applied to the computer 10 and therefore, it is determined at step S1703 that this patch is not a patch that has been applied to the computer 10.

The system information of this patch includes "SCSIA001 RAIDA001" as indicated in the patch data 800. The system information 500 depicted in FIG. 5 includes "SCSIA001" and "RAIDA001" and therefore, it is determined at step S1704 that the system information included in the selection conditions of this patch coincides with the system information of the computer 10.

Therefore, the patch (the patch number: 2007001) that corresponds to the patch data 800 is identified as a candidate patch for application at step S1705. In this case, it is determined at step S1603 of FIG. 16 that the candidate patch has been identified by the system log analysis executed at steps S1602, and the patch (the patch number: 2007001) that corresponds to the patch data 800 is displayed at step S1614.

FIG. 18 is a flowchart of an example of the program log analysis depicted in FIG. 16. At steps S1605 and S1607 of FIG. 16, program analysis such as that depicted in FIG. 18 is executed for one program to be analyzed. It is first determined whether a patch having selection conditions inclusive of a program that coincides with the program to be analyzed is present in the database 331 (step S1801).

If it is determined that no patch for a program coinciding with the program to be analyzed is present (step S1801: NO), the program log analysis comes to an end. If it is determined that a patch for a program coinciding with the program to be analyzed is present (step S1801: YES), failure detection information is extracted from the program log output from the program log obtaining unit 352 (step S1802).

With respect to one patch, among the patches for which it has been determined at step S1801 that the program coincides, it is determined whether the patch has been applied to the computer 10 (step S1803). At step S1803, it is determined whether the patch has been applied, by referring to the patch application information output from the patch application information obtaining unit 370.

At step S1803, if it is determined that the patch has been applied to the computer 10 (step S1803: YES), operation proceeds to step S1807 and continues. If it is determined that the patch has not been applied to the computer 10 (step S1803: NO), it is determined whether the failure detection information in the program log of the patch coincides with the failure detection information extracted at step S1802 in the database 331 (step S1804).

If it is determined at step S1804 that the failure detection information in the program log does not coincide (step S1804: NO), operation proceeds to step S1807 and continues. If it is determined that the failure detection information in the program log coincides (step S1804: YES), it is determined whether the system information included in the selection conditions of the patch coincides with the system information of the computer 10 (step S1805).

At step S1805, if it is determined that the system information does not coincide (step S1805: NO), operation proceeds to step S1807 and continues. If it is determined that the system information coincides (step S1805: YES), the patch is identified as a candidate patch for application (step S1806). It is determined whether each of the patches, for which it has been determined at step S1801 that the program coincides, has been processed at step S1803 (step S1807).

If it is determined that each of the patches has not been processed at step S1807 (step S1807: NO), operation returns to step S1803 and among the patches for which it has been determined at step S1801 that the program coincides, patches that have not been processed at step S1803 are processed. If it is determined that each of the patches has been processed (step S1807: YES), the program log analysis comes to an end.

It is assumed at the above steps that the program to be analyzed is "SCSI driver V1.0L00". The program "SCSI driver V1.0L00" coincides with, for example, the program included in the selection conditions of patch data 1100 depicted in FIG. 11 and therefore, the patch that corresponds to the patch data 1100 is detected at step S1801.

FIG. 19 is a diagram of an example of the program log. The program log obtaining unit 352 outputs a program log such as that denoted by a reference numeral "1900" of FIG. 19. If the program output by the program obtaining unit 361 is " . . . 10 (program–1)/condition 1, 10 (program–2)/condition 2 . . . " as in the program log 1900, the failure detection information "condition 1=10, condition 2=10" of the program log is extracted at step S1802 of FIG. 18.

The patch number of the patch data 1100 is "2007002". Information indicating that the patch having the patch number "2007002" is applied to the computer 10 is not present in the patch application information 1500 depicted in FIG. 15 and therefore, it is determined at step S1803 of FIG. 18 that this patch is not a patch that has been applied to the computer 10.

The failure detection information included in the selection conditions of the patch data 1100 includes failure detection information "condition 1=10, condition 2=10" of the program log. The failure detection information of the program log extracted at step S1802 of FIG. 18 also indicates "condition 1=10, condition 2=10" and therefore, it is determined at step S1804 of FIG. 18 that the failure detection information of the program logs coincide with each other.

The system information included in the selection conditions of the patch data 1100 includes "SCSIA001 RAIDA001". The system information 500 depicted in FIG. 5 includes "SCSIA001" and "RAIDA001" and, therefore, it is determined at step S1804 that the system information included in the selection conditions of this patch coincides with the system information of the computer 10.

Therefore, the patch (the patch number: 2007002) that corresponds to the patch data 1100 is identified as a candidate patch for application. In this case, it is determined at step S1606 (or S1608) of FIG. 16 that the candidate patch for application has been identified by the program log analysis executed at step S1605 (S1607), and the patch (the patch number: 2007002) that corresponds to the patch data 1100 is displayed at step S1614.

Figure 20:
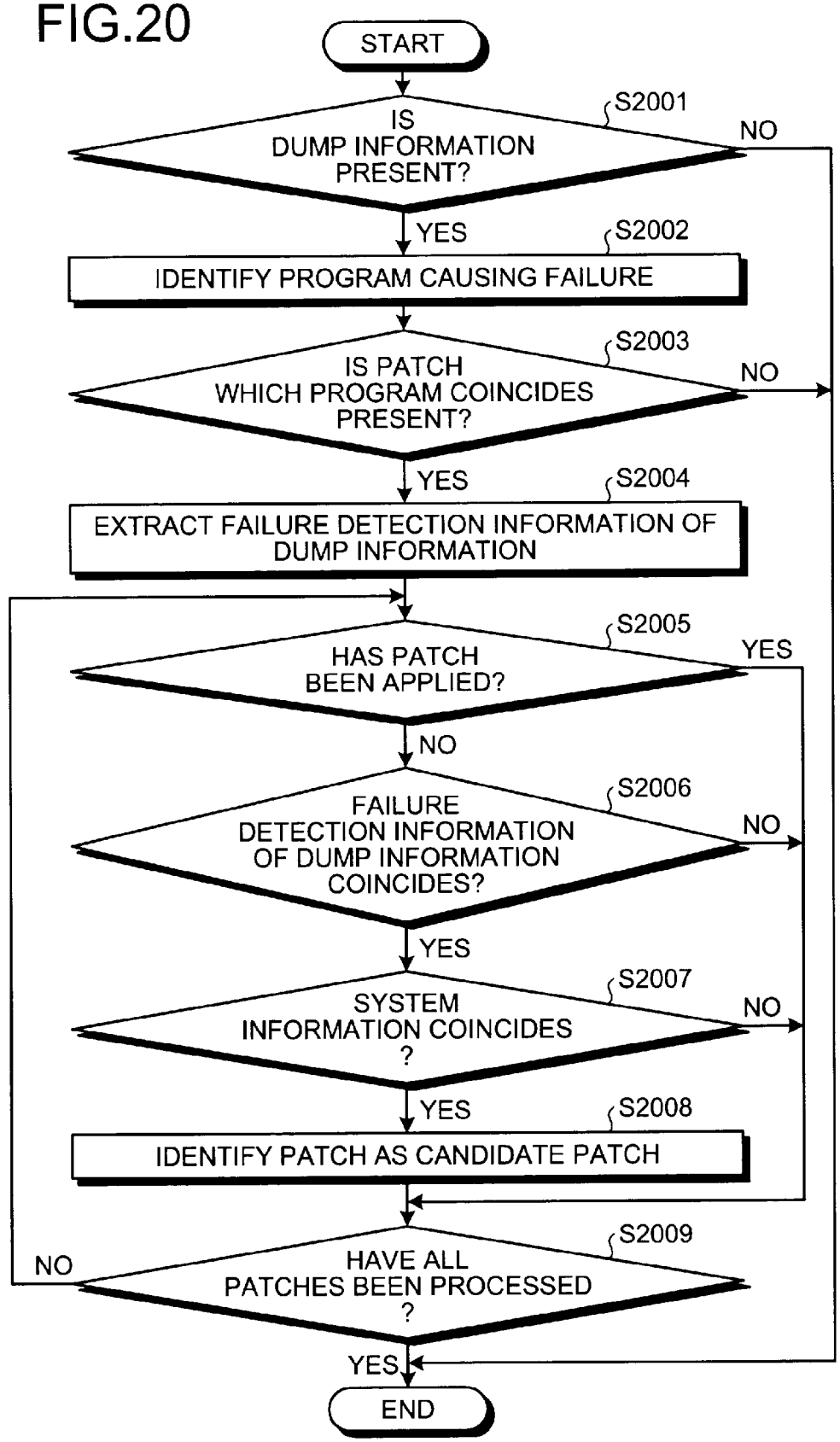
FIG. 20 is a flowchart of an example of dump-information analysis depicted in FIG. 16.

FIG. 20 is a flowchart of an example of the dump-information analysis depicted in FIG. 16. Dump-information analysis such as that depicted in FIG. 20 is executed at step S1610 of FIG. 16. When a failure has occurred at the computer 10, it is first determined whether dump information obtained by the dump information obtaining unit 353 is present (step S2001). If it is determined that no dump information is present (step S2001: NO), the dump-information analysis comes to an end.

If it is determined at step S2001 that dump information is present (step S2001: YES), a program that has caused the failure to occur at the computer 10 is identified based on the dump information (step S2002). It is determined whether a patch having selection conditions inclusive of a program that coincides with the program identified at step S2002 is present in the database 331 (step S2003).

If it is determined at step S2003 that no patch for a program coinciding with the program to be analyzed is present (step S2003: NO), the dump-information analysis comes to an end. If it is determined that a patch for a program that coincides with the program to be analyzed is present (step S2003: YES), the dump-information analysis plug-in 363 extracts failure detection information of the dump information from the dump information output from the dump information obtaining unit 353 (step S2004).

With respect to one patch, among the patches for which it has been determined at step S2003 that the program coincides, it is determined whether the patch has been applied to the computer 10 (step S2005). If it is determined that the patch has been applied to the computer 10 (step S2005: YES), operation proceeds to step S2009 and continues.

If it is determined at step S2005 that the patch has not been applied to the computer 10 (step S2005: NO), it is determined whether failure detection information included in the selection conditions of the patch coincides with the failure detection information of the dump information extracted at step S2004 (step S2006).

If it is determined at step S2006 that the failure detection information of the dump information does not coincide (step S2006: NO), operation proceeds to step S2009 and continues. If it is determined that the failure detection information of the dump information coincides (step S2006: YES), it is determined whether the system information included in the selection conditions of the patch coincides with the system information of the computer 10 (step S2007).

If it is determined at step S2007 that the system information does not coincide (step S2007: NO), operation proceeds to step S2009 and continues. If it is determined that the system information coincides (step S2007: YES), the patch is identified as a candidate patch for application (step S2008). It is determined whether all the patches for which it is determined at step S2003 that the programs coincide have been processed at step S2005 (step S2009).

If it is determined that all the patches have not been processed (step S2009: NO), operation returns to step S2005, and among the patches for which it has been determined at step S2003 that the program coincides, patches that have not been processed at step S2005 are processed. If it is determined that all the patches have been processed (step S2009: YES), the dump-information analysis comes to an end.

In the above steps, it is assumed that the program identified at step S2002 is, for example, "SCSI driver V1.0L00". The program "SCSI driver V1.0L00" coincides with, for example, the program included in the selection conditions of patch data 1400 depicted in FIG. 14 and, therefore, a patch that corresponds to the patch data 1400 is detected at step S2003.

FIG. 21 is a diagram of an example of the dump information. The dump information obtaining unit 353 outputs dump information such as that denoted by a reference numeral "2100" of FIG. 21. When the dump information output by the dump information obtaining unit 353 is " . . . , address abcd000000001234, down code 100, . . . " like the dump information 2100, failure detection information "address abcd000000001234, down code 100" of the dump information is extracted at step S2004 of FIG. 20.

The patch number of the patch that corresponds to the patch data 1400 is "2007003". Information indicating that the patch having the patch number "2007003" is applied to the computer 10 is not present in the patch application information 1500 depicted in FIG. 15 and, therefore, it is determined at step S2005 of FIG. 20 that this patch is not a patch that has been applied to the computer 10.

The failure detection information included in the selection conditions of the patch data 1400 includes the failure detection information "address abcd000000001234" and "down code 100" of the dump information. The failure detection information of the dump information extracted at step S2004 of FIG. 20 is also "address abcd000000001234, down code 100" and, therefore, it is determined at step S2006 of FIG. 20 that the failure detection information of the dump information coincide with each other.

The system information included in the selection conditions of the patch data 1400 includes "SCSIA001 RAIDA001". The system information 500 depicted in FIG. 5 includes both of "SCSIA001" and "RAIDA001" and, therefore, it is determined at step S2007 that the system information included in the selection conditions of this patch coincides with the system information of the computer 10.

Therefore, a patch (the patch number: 2007003) that corresponds to the patch data 1400 is identified at step S2008 as a candidate patch for application. In this case, it is determined at step S1611 of FIG. 16 that the candidate patch for application is identified by the dump-information analysis at step S1610, and the patch (the patch number: 2007003) that corresponds to the patch data 1400 is displayed at step S1614.

FIG. 22 is a flowchart of an example of the level-down analysis depicted in FIG. 16. As depicted in FIG. 22, the date and the time of the occurrence of the failure in the computer 10 are first identified based on analysis information output from the system log analysis plug-in 361, the program log analysis plug-in 362, and the dump-information analysis plug-in 363 (step S2201).

A program that has caused the failure is identified based on the above announced failure information (step S2202). It is determined whether a patch that has been applied to the computer 10 and whose date and time of the application coincide with the date and the time identified at step S2201 is present, based on the patch application information output from the patch application information obtaining unit 370 (step S2203).

If it is determined at step S2203 that no patch whose date and time coincide with that identified at step S2201 is present (step S2203: NO), the level-down analysis comes to an end. If it is determined that a patch for which the date and the time coincide with that identified at step S2201 is present (step S2203: YES), with respect to one patch, among the patches for which it is determined that the date and the time coincide with that identified at step S2201, it is determined whether a program included in the selection conditions of the patch coincides with the program identified in the database 331 at step S2202 (step S2204).

If it is determined at step S2204 that the program does not coincide (step S2204: NO), operation proceeds to step S2206 and continues. If it is determined that the program coincides (step S2204: YES), the patch that has been applied is identified as a candidate level-down patch that may have caused the level-down (step S2205).

It is determined whether each of the patches that have been applied and for which it has been determined at step 2303 that the date and the time coincide with that identified at step S2201, has been processed at step S2203 (step S2206). If it is determined that each of the patches that has been applied has not been processed (step S2206: NO), operation returns to step S2204 and the patches that have been applied and that have not been processed are processed. If it is determined that all of the patches have been processed (step S2206: YES), a series of level-down analysis operations comes to an end.

As described, according to the embodiment, the database 331 that stores therein patches and respective selection conditions created in advance, and a candidate patch corresponding to a failure that has occurred to the computer 10 is automatically selected by searching the database using information that identifies the failure is extracted from the record information of the computer 10 concerning the time when the failure occurred.

Thereby, the least necessary candidate patches are automatically selected, reducing the download and application processes of the patches and preventing a shutting down of the computer 10 for a long time. The possibility of an occurrence of a level-down is also reduced by not applying more patches than necessary.

A patch that corresponds to a failure is selected with high precision by using an error message extracted from a system log concerning the time when the failure occurred, a specific program log concerning the time when the failure occurred, dump item concerning the time when the failure occurred, etc., as various types of information identifying the failure. A patch that corresponds to the failure is efficiently selected by excluding the patches that have been applied to the computer, from among the patches in the database 331, from which selection is made.

A candidate patch that corresponds to the failure is selected with high precision by searching a database that stores therein patches and respective selection conditions using information that identifies the failure and that is extracted from the record information of the computer 10 concerning the time when the failure occurred and using the system information of the computer 10. If no patch whose selection conditions are satisfied is identified, a patch that may have caused the level down is automatically selected by identifying a patch whose date and time of application coincide with the date and the time of the failure, among the patches that have been applied to the computer 10.

In the embodiment, an example has been described where the candidate-patch selecting apparatus 100 is applied to the computer 10 on the client side that receives provision of the patches from a server. However, the candidate-patch selecting apparatus 100 may be applied to, for example, another computer that monitors the computer 10 on the client side that receives the provision of the patches from the server.

The candidate-patch selecting method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the recording medium, and executed by the computer. The program may be a transmission medium that can be distributed through a network such as the Internet.

The candidate-patch selecting apparatus described in the present embodiment can be realized by an application specific integrated circuit (ASIC) such as a standard cell or a structured ASIC, or a programmable logic device (PLD) such as a field-programmable gate array (FPGA). For example, functions of the candidate-patch selecting apparatus 100 are defined in hardware description language (HDL) (reference numbers of functional blocks are entered), which is logically synthesized and applied to the ASIC, the PLD, etc., thereby enabling manufacture of the candidate-patch selecting apparatus 100.

According to the candidate-patch selecting apparatus, the candidate-patch selecting program, and the candidate-patch selecting method, an effect is achieved that the least necessary candidate patches may automatically be selected.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A candidate-patch selecting apparatus comprising:
   a detector configured to detect a failure of a computer;
   an obtaining unit configured to obtain record information including a system log that is a log of system messages of the computer, recorded at the time when the failure detected by the detector occurred;
   an extracting unit configured to extract from the system log included in the record information obtained by the obtaining unit, an error message of the failure as information identifying the failure;
   an identifying unit configured to identify, based on a database that stores therein patches and respective selection conditions, a patch, for which a selection condition is satisfied by the extracted information identifying the failure, from among a plurality of patches by identifying a patch having an error message that is included among the selection conditions and that includes with the error message extracted by the extractor; and
   an output unit configured to output an identification result acquired by the identifying unit,
   wherein the obtaining unit further obtains, as the record information, a program log that is a log of operations of a program installed in the computer, and
   the extracting unit extracts from the program log obtained by the obtaining unit, the information identifying the failure.

2. The candidate-patch selecting apparatus according to claim 1, wherein
   the obtaining unit further obtains dump information of the computer as the record information, and
   the extractor extracts from the dump information obtained by the obtaining unit, the information identifying the failure.

3. The candidate-patch selecting apparatus according to claim 1, wherein
   the identifying unit further identifies a patch for which the selection conditions are satisfied, from among patches remaining after patches that have been applied to the computer are excluded from the patches stored in the database.

4. The candidate-patch selecting apparatus according to claim 1, further comprising
   a system information obtaining unit configured to obtain system information of the computer, wherein
   the identifying unit further identifies a patch for which the system information obtained by the system information obtaining unit coincides with the selection conditions.

5. The candidate-patch selecting apparatus according to claim 1, wherein
   the identifying unit, when no patch that satisfies the selection conditions is identifiable, identifies, among the patches that have been applied to the computer, a patch having a date and time of application that coincides with the date and the time of the occurrence of the failure detected by the detector.

6. A tangible computer-readable recording medium storing therein a candidate-patch selecting program causing a computer to execute a process comprising:

detecting a failure of the computer;

obtaining a system log that is a log of system messages of the computer, recorded at the time when the failure detected at the detecting occurred;

extracting from the system log obtained at the obtaining, an error message of the failure;

identifying, based on a database that stores therein patches and respective selection conditions, a patch from among a plurality of patches, the patch having an error message that is included among selection conditions and that coincides with the error message extracted by the extractor; and outputting an identification result acquired at the identifying, wherein a program log that is a log of operations of a program installed in the computer is further obtained as the record information at the obtaining, and the information identifying the failure is extracted at the extracting from the program log obtained at the obtaining.

7. A candidate-patch selecting method comprising:

detecting a failure of a computer;

obtaining a system log that is a log of system messages of the computer, recorded at the time when the failure detected at the detecting occurred;

extracting from the system log obtained at the obtaining, an error message of the failure;

identifying, based on a database that stores therein patches and respective selection conditions, a patch from among a plurality of patches, the patch having an error message that is included among selection conditions and that coincides with the error message extracted by the extractor; and outputting an identification result acquired at the identifying, wherein a program log that is a log of operations of a program installed in the computer is further obtained as the record information at the obtaining, and the information identifying the failure is extracted at the extracting from the program log obtained at the obtaining.

* * * * *